(12) United States Patent
Fathy

(10) Patent No.: US 10,985,570 B2
(45) Date of Patent: Apr. 20, 2021

(54) SELF-BALANCING PHOTOVOLTAIC ENERGY STORAGE SYSTEM AND METHOD

(71) Applicant: The Penn State Research Foundation, University Park, PA (US)

(72) Inventor: Hosam K. Fathy, State College, PA (US)

(73) Assignee: THE PENN STATE RESEARCH FOUNDATION, University Park (PA)

( * ) Notice: Subject to any disclaimer, the term of this patent is extended or adjusted under 35 U.S.C. 154(b) by 0 days.

(21) Appl. No.: 16/311,937

(22) PCT Filed: Jun. 1, 2017

(86) PCT No.: PCT/US2017/035405
§ 371 (c)(1),
(2) Date: Dec. 20, 2018

(87) PCT Pub. No.: WO2017/210402
PCT Pub. Date: Dec. 7, 2017

(65) Prior Publication Data
US 2019/0181646 A1 Jun. 13, 2019

Related U.S. Application Data

(60) Provisional application No. 62/344,587, filed on Jun. 2, 2016.

(51) Int. Cl.
*H02J 3/38* (2006.01)
*H02S 40/38* (2014.01)
(Continued)

(52) U.S. Cl.
CPC ............... *H02J 3/385* (2013.01); *G05F 1/67* (2013.01); *H01M 10/441* (2013.01);
(Continued)

(58) Field of Classification Search
CPC .. H01M 10/482; H01M 10/46; H01M 10/441; H01M 2010/4271; H02J 7/0014;
(Continued)

(56) References Cited

U.S. PATENT DOCUMENTS

| 2008/0100258 | A1* | 5/2008 | Ward ...................... B60L 8/003 320/101 |
| 2015/0244306 | A1* | 8/2015 | Estes ....................... H02S 40/38 700/287 |
| 2017/0012578 | A1* | 1/2017 | Estes ....................... H02S 40/42 |

FOREIGN PATENT DOCUMENTS

| CN | 104143955 A | * 11/2014 | ............. H02S 40/30 |
| CN | 104836321 | 8/2015 | |

OTHER PUBLICATIONS

Li, X. et al., Maximum Power Point Tracking for Photovoltaic System Using Adaptive Extremum Seeking Control, IEEE Transactions on Control Systems Technology, 21(6): 2315-2311, Nov. 27, 2013.

(Continued)

*Primary Examiner* — Jared Fureman
*Assistant Examiner* — Duc M Pham
(74) *Attorney, Agent, or Firm* — Dinsmore & Shohl LLP

(57) ABSTRACT

A photovoltaic (PV) energy storage system having a plurality of hybrid cells operable to generate DC electrical power. Each hybrid cell includes at least one solar power generation unit and a power storage device connected in parallel. The power storage devices of the plurality of hybrid cells are connected in series and the DC electrical power derived from the series of these power storage devices energizes a DC power load. The PV energy storage system has an inverter operable to convert DC electrical power into AC electrical power and is electrically coupled to the series of (Continued)

the power storage devices. The PV energy storage system energizes an AC power load, such as a power grid.

20 Claims, 14 Drawing Sheets

(51) Int. Cl.
| | |
|---|---|
| *H02J 7/35* | (2006.01) |
| *G05F 1/67* | (2006.01) |
| *H01M 10/46* | (2006.01) |
| *H01M 10/44* | (2006.01) |
| *H02J 1/10* | (2006.01) |
| *H01M 10/48* | (2006.01) |
| *H02S 40/32* | (2014.01) |
| *H02J 7/00* | (2006.01) |
| *H01M 10/42* | (2006.01) |
| *H01M 10/052* | (2010.01) |

(52) U.S. Cl.
CPC ......... *H01M 10/46* (2013.01); *H01M 10/482* (2013.01); *H02J 1/102* (2013.01); *H02J 7/0014* (2013.01); *H02J 7/35* (2013.01); *H02S 40/32* (2014.12); *H02S 40/38* (2014.12); *H01M 10/052* (2013.01); *H01M 2010/4271* (2013.01); *Y02E 10/56* (2013.01)

(58) Field of Classification Search
CPC .......... H02J 1/102; H02J 3/385; H02S 40/38; G05F 1/67; Y02E 10/58
See application file for complete search history.

(56) References Cited

OTHER PUBLICATIONS

Ye, C. et al., Dynamic Energy Management of Hybrid Energy Storage Systems with a Hierarchical Structure, Energies, 9: 395, May 24, 2016.
English Translation of Abstract of Chinese CN-104836321.

* cited by examiner

SELF-BALANCING PHOTOVOLTAIC ENERGY STORAGE SYSTEM AND METHOD

REFERENCE TO RELATED APPLICATION

This application claims priority to U.S. Provisional Patent Application Ser. No. 62/344,587, filed Jun. 2, 2016, the entire content of which is incorporated herein by reference.

FIELD OF THE INVENTION

The present invention relates to photovoltaic (PV) systems, and more specifically to the storage, management, optimization, and conversion of the electric energy they generate from DC to AC.

BACKGROUND OF THE INVENTION

During the past decade, there has been a rapid growth in the field of photovoltaic electricity generation. In the United States (US) alone, PV generation capacity is expected to grow to 135 GWe by 2030 compared to only 7 GWe in 2012. This growth creates a key challenge: once intermittent renewable resources such as solar and wind energy exceed 20-25% market penetration, balancing instantaneous electricity supply and demand will become difficult for the traditional power grid. Therefore, technologies such as demand response and stationary energy storage are essential for addressing this challenge. Electrochemical energy storage technologies, particularly lithium-ion batteries, are rapidly becoming an appealing grid energy storage solution because of the ongoing rapid improvements in their longevity and cost.

The cost of integrating electrochemical batteries into a PV farm can be quite high, partly due to the cost of the batteries themselves, and partly due to the high cost of the power electronics needed for integration. FIG. 1 shows a schematic of a typical PV farm 10 with a battery pack. Power electronics are needed for: (i) converting the farm's DC power to AC; (ii) controlling the input voltage of the PV modules to achieve photovoltaic maximum-power-point tracking (MPPT); (iii) controlling charging/discharging of the battery pack; and (iv) balancing the state of charge (SOC) among different cells in the battery pack to prevent accidental damage via overcharging/over-discharging. The cost of the inverters, DC-DC converters, and balancing circuits needed for achieving these goals can be a significant fraction of the overall cost of the farm.

Generally, a photovoltaic system 10 includes a photovoltaic (PV) array 100 made up of one or more PV panels or modules composed of photovoltaic cells capable of converting solar energy into direct current (DC) electrical energy, a battery pack 110 made up of one or more batteries for storing the electrical energy produced by the photovoltaic array 100, and a charge controller for controlling the charging of the one or more batteries with the electrical energy produced by the photovoltaic array 100. The direct current (DC) electrical energy produced by the photovoltaic array 100 and/or stored in the battery pack 110 is available to power a DC load. In some systems, the DC load may include an inverter 160 used to convert the direct current (DC) electrical energy into alternating current (AC) electrical energy suitable to power AC loads. Photovoltaic systems 10 are sometimes employed to power loads independent of utility power, such as where electrical power from the public utility grid 170 is unavailable or not feasible, and these photovoltaic systems are commonly referred to as "off-grid" and "stand-alone" photovoltaic systems.

Earlier, photovoltaic systems had been designed with traditional charge controllers that do not employ maximum-power-point tracking (MPPT), and such charge controllers may be referred to as non-MPPT charge controllers. In the non-MPPT charge controllers, the aggregate output of the PV array is generally fed directly to the battery bank for charging. Usually there is a mismatch between the output voltage of the PV array and the voltage required to charge the battery bank that results in under-utilization of the maximum power output from the PV array. When a non-MPPT charge controller is charging the battery, the PV module is frequently forced to operate at a battery voltage that is different from the optimal operating voltage at which the PV module is capable of producing its maximum power. Hence, non-MPPT charge controllers artificially limit power production to a sub-optimal level by constraining the PV array from operating at maximum output power.

In contrast, the maximum-power-point tracking (MPPT) charge controllers 130 address the aforesaid disadvantage of non-MPPT charge controllers by managing the voltage mismatch between the PV array 100 and the battery pack 110 through the use of power electronics. The primary functions performed by MPPT charge controllers 130 involve measuring the PV module output to find the maximum power voltage ($V_{mp}$), i.e. the voltage at which the PV module is able to produce maximum power, operating the PV module at the maximum power voltage to extract or harvest full power (watts) from the PV array 100, regardless of the present battery voltage ($V_B$), and in some cases protecting the battery pack 110 from overcharge.

Photovoltaic modules are generally made up of photovoltaic (PV) cells that have a single operating point where the values of the current (I) and voltage (V) of the cell result in a maximum power output. The maximum power voltage $V_{mp}$ varies with operating conditions including weather, sunlight intensity, shading, and PV cell temperature. As the maximum power voltage $V_{mp}$ of the PV module 100 varies, MPPT charge controllers 130 "track" the $V_{mp}$ and adjust the ratio between the maximum power voltage and the current delivered to the battery pack 110 in order to match what the battery requires. MPPT charge controllers 130 utilize a control circuit or logic to search for the maximum power output operating point and employ power electronics to extract the maximum power available from a PV module.

MPPT charge controllers generally employ power converters designed for a higher input voltage than output voltage, hence $V_{mp} > V_B$. The power converters are conventionally designed to include a DC-to-DC converter that receives the maximum power voltage $V_{mp}$ from the PV array 100 as the converter input and converts the maximum power voltage to battery voltage $V_B$ as the converter output. An increase in battery charge power is realized by harvesting PV module power that would be left unharvested using a non-MPPT charge controller. As the maximum power voltage varies, the actual charge power increase that is realized will likewise vary. Generally speaking, the greater the mismatch or disparity between the PV array maximum power voltage $V_{mp}$ and the battery voltage $V_B$, the greater the charge power increase will be. The charge power increase will ordinarily be greater in cooler temperatures because the available power output and the maximum power voltage of the PV module increase as the photovoltaic cell temperature decreases.

Most MPPT charge controllers utilize power electronics designed to include a "buck" converter having topology to "buck" or "step-down" a higher input voltage to a lower output voltage. A buck converter (step-down converter) is a DC-to-DC power converter, which steps down voltage (while stepping up current) from its input (supply) to its output (load). It is a class of Switched-Mode Power Supply (SMPS) typically containing at least two semiconductors (a diode and a transistor, although modern buck converters frequently replace the diode with a second transistor used for synchronous rectification) and at least one energy storage element, a capacitor, an inductor, or the two in combination. To reduce voltage ripple, filters made of capacitors (sometimes in combination with inductors) are normally added to such a converter's output (load-side filter) and input (supply-side filter). DC-to-DC converters provide much greater power efficiency than linear regulators, which are simpler circuits that lower voltage by dissipating power as heat, which does not step up the output current.

FIG. 1 provides an overview of the power electronics needed in today's combined PV/solar farms. In this prior art system, an inverter 160 is generally used for exchanging electricity with the grid 170. Depending on the precise configuration of the PV farm 10, the inverter 160 may be fed from a regulated DC bus 150. PV modules 100 feed power into DC bus 150 through DC-DC converters 130. These DC-DC converters adjust the operating voltages of these PV modules to achieve maximum-power-point tracking (MPPT), typically on a module-by-module basis. If a battery pack 110 is integrated into this system, then DC-DC conversion is also needed for charging and discharging the battery pack. A DC-DC converter 140 may be used for charging and discharging the battery pack 110 from and into the DC bus 150, respectively. The battery pack 110 typically exploits a balancing circuit 120 to suppress charge imbalances among its cells. This balancing circuit 120 is particularly critical for lithium-ion packs, where a charge imbalance can lead to catastrophic failures. FIGS. 2A-D show four examples of battery pack balancing circuits 120, namely: (a) the shunt resistor circuit; (b) the "flying capacitor" circuit; (c) cell-to-cell DC-DC conversion; and (d) pack-level DC-DC conversion, respectively.

The above power electronics are quite complex and expensive. It is generally estimated that the cost of these power electronics are $0.2-$0.3 per Watt of generation capacity in a combined PV/energy storage farm. This may be approximately 10-15% of the total cost of the farm. The research and development (R&D) industry is actively pursuing reductions in the cost of these power electronics through fundamental component and subsystem-level innovations. For example, scientists are actively pursuing new transistors with higher efficiencies and lower costs, and new solar inverters with higher operating voltages and lower losses. While all of these innovations are important, they do not disrupt or challenge the current system topology employed in combined PV/storage farms.

In spite of all the above stated advancements, the balance of system (BOS) cost associated with integrating electrochemical batteries into photovoltaic (PV) systems is not diminishing rapidly enough for widespread technology adoption. The balance of system (BOS) cost encompasses all components of a photovoltaic system other than the photovoltaic panels. This includes wiring, switches, mounting system, solar inverter, and battery bank and battery charger. In particular, the power electronics needed for integrating batteries into PV systems continue to be quite complex and expensive. Therefore, there is a need for a new technology that overcomes the limitations of the existing systems.

SUMMARY OF THE INVENTION

Certain embodiments of the present invention may reduce the cost of the power electronics needed for this integration by approximately 30 percent. The present invention enables existing PV systems to: (i) accommodate generation intermittencies and (ii) provide ancillary services to the grid such as frequency regulation and energy arbitrage at a relatively lower cost. The present invention's benefits will go beyond simple reductions in cost. Certain embodiments of this invention enable photovoltaic maximum-power-point tracking (MPPT) at a high level of granularity, thereby optimizing overall PV generation. In contrast to the prior art, certain embodiments of the present invention furnish a battery pack with a self-balancing capability, and with a self-balancing time constant that is completely independent of the battery pack size. This enables high-voltage battery pack operation (at voltages in the 2 kV-3 kV range), thereby minimizing heat dissipation in the combined PV-storage system. The battery pack for use with certain embodiments of the present invention may be a single battery cell or a combination of battery cells connected in parallel and/or series. Assembly of high voltage battery packs is an issue in the prior art since the time to eliminate cell imbalances by balancing power electronics is dependent on the string length and increases with increasing string length for some balancing architectures. In particular, certain embodiments of the present invention improve the overall efficiency of combined PV/storage systems and reduce the cost of these systems.

According to one embodiment of the present invention, a photovoltaic (PV) energy storage system may have a plurality of hybrid cells operable to generate DC electrical power. Each hybrid cell may have at least one solar power generation unit and an energy storage device connected in parallel. The power storage devices of these hybrid cells are connected in series. The DC electrical power derived from the series of these power storage devices energizes a DC power load. The PV energy storage system may have an inverter operable to convert DC electrical power into AC electrical power and may be electrically coupled to the series of the power storage devices. Thus, the PV energy storage system may be used for energizing an AC power load.

In certain embodiments, the hybrid cell has two or more solar power generating units connected in series and/or in parallel. The solar power generating unit may be selected from the group consisting of a photovoltaic cell, a solar cell, and a solar panel. The photovoltaic energy storage system may be electrically coupled to a distribution grid and the distribution grid may be a public power grid. Alternately, the PV energy storage system may be electrically coupled to a local network.

In certain embodiments, the PV energy storage system has an inverter that may be selected from the group consisting of an off-the-grid inverter and a grid tie-in inverter. The energy storage device is a battery pack and the battery pack may have one or more battery cells. The photovoltaic energy storage system of some embodiments of the present invention may have an optional feature of a connecting device, such that the solar power generation unit is electrically connected to the energy storage device through the connecting device. The connecting device may be a DC-DC converter or a buck-boost converter.

The present invention creates a new technical challenge because traditional photovoltaic MPPT algorithms will fail to work with the above hardware configuration since they operate by sensing a terminal voltage and current across the PV array. In certain embodiments of the present invention, current and voltage of each PV array in a hybrid string is measured directly and used for MPPT. In absence of such granular sensing, the traditional MPPT algorithms may draw too much current from the above system, thereby automatically depleting the battery and failing to operate at the photovoltaic maximum power point. The present invention addresses this challenge through a software innovation/MPPT algorithm shown in FIG. 5. The overall current generated by the hybrid PV/storage string and the voltage output of each hybrid PV/storage cell is measured. These two measurements are fed into a well-parameterized model of each hybrid PV/storage cell's battery. The voltage predicted by this model may be different from the actual voltage of the hybrid PV/storage cell, because the model does not account for the battery input current coming from the photovoltailcs. This prediction error is corrected using an observer. The observer will estimate photovoltaic current and power. The power estimate is fed into a MPPT algorithm such as "extremum-seeking" that may adjust the DC-DC conversion ratio in the hybrid PV/storage cell in order to optimize the hybrid PV/storage cell's solar power generation. By doing this, a hybrid cell-level, model-based photovoltaic MPPT may be achieved. Certain embodiments of the photovoltaic energy storage system use the model-based photovoltaic MPPT method on the entire string in an average sense. In such a situation, only the voltage output of the entire string is measured, and the photovoltaic current and power estimated by the observer is the average PV current and power of the entire string. As an example, if a hybrid string is constructed with three hybrid cells in series and the PV generated current in each hybrid cell is respectively $I_{PV,L,1}$, $I_{PV,L,2}$, and $I_{PV,L,3}$, then the observer estimated PV generated current when only string-level load current and voltage measurements are available may be $(I_{PV,L,1}+I_{PV,L,2}+I_{PV,L,3})/3$.

Certain embodiments of the photovoltaic energy storage system have a controller with a maximum power point tracking (MPPT) that is operable to implement an extremum-seeking algorithm to adjust the DC-DC conversion ratio between the at least one solar power generation unit and the power storage device. The controller thus optimizes an output of the hybrid cell based on a current generated by the series of the hybrid cells and a voltage output of each of the plurality of hybrid cells or the series of the plurality of hybrid cells. Yet in some embodiments of the present invention, the solar power generating unit 210 is directly connected with the energy storage device 230. In other embodiments, the solar power generating unit 210 is directly connected with the power storage device 230 without a connecting device 220.

The present invention also discloses a method that includes the steps of (a) providing a plurality of hybrid cells, wherein each hybrid cell includes at least one solar power generating unit and an energy storage device; (b) generating a DC electrical power by the solar power generating units; (c) connecting the at least one solar power generating unit and the power storage device of each hybrid cell in parallel; (d) transferring the DC electrical power from the at least one solar power generating unit to the power storage cell; and (e) connecting the energy storage devices of the plurality of hybrid cells in series. The DC electrical power derived from the series of these power storage devices may energize a DC power load. The PV energy storage system may have an inverter operable to convert the DC electrical power into AC electrical power and the inverter is electrically coupled to the series of the power storage devices. The method may have a step of connecting at least one inverter to the series of power storage devices and transferring the DC electrical power from the power storage devices to the at least one inverter. The PV energy storage system is thus used for energizing an AC power load.

Some methods of the present invention may have the steps of providing two or more solar power generating units for any of the plurality of hybrid cells; and connecting the two or more solar power generating units in series and/or parallel. The method may also have a step of selecting the at least one solar power generating unit from the group consisting of a photovoltaic cell, a solar cell and a solar panel. Some embodiments of the method may have the step of connecting the photovoltaic energy storage system to a distribution grid and/or connecting to a public power grid as the distribution grid.

Some embodiments of the method of the present invention may have a step of connecting the photovoltaic energy storage system to a local network. Yet another step may be selecting the inverter from the group consisting of an off-the-grid inverter and a grid tie-in inverter. The method may have a step of connecting a battery pack as the power storage device and the battery pack may include a single or multiple battery cells.

Another embodiment of the method of the present invention may have a step of providing a connecting device and connecting the at least one solar power generation unit to the power storage device through the connecting device. Yet another step may include providing a DC-DC converter as the connecting device that may be a buck-boost converter. Some embodiments of the method may have the steps of (a) providing a controller with a maximum-power-point tracking (MPPT) that may be operable to implement an extremum-seeking algorithm; (b) measuring a current generated by the series of the plurality of hybrid cells and a voltage output of each or all of the plurality of hybrid cells; (c) communicating the current generated and the voltage output to the controller; (d) adjusting the DC-DC conversion ratio between the at least one solar power generation unit and the power storage device by the extremum-seeking algorithm; and (e) optimizing an output of the hybrid cell based on the current and the voltage by the extremum-seeking algorithm. Some method embodiments may have a step of directly connecting the solar power generating unit 210 with the power storage device 230. Yet another embodiment may have a step of directly connecting the solar power generating unit 210 with the power storage device 230 without a connecting device 220.

BRIEF DESCRIPTION OF THE DRAWINGS

The accompanying drawings, which are included to provide a further understanding of the invention and are incorporated in and constitute a part of this application, illustrate embodiment(s) of the present invention and together with the description serve to explain the principle of the invention. In the drawings.

DETAILED DESCRIPTION OF THE INVENTION

A self-balancing photovoltaic energy storage system and method according to the present invention may take a variety of forms. Various examples of the present invention are shown in the Figures. However, the present invention is not limited to the illustrated embodiments. Reference will now be made in detail to some embodiments of the present invention, examples of which are illustrated in the accompanying figures. Wherever possible, the same reference numbers will be used throughout the drawings to refer to the same or like parts. Additional objects and features of the invention will be set forth in part in the description that follows and in part will become apparent to those having ordinary skill in the art upon examination of the following or may be learned from practice of the invention. The objectives of the invention may be realized and attained by the structure particularly pointed out in the written description and claims hereof as well as the appended figures.

Figure 1:
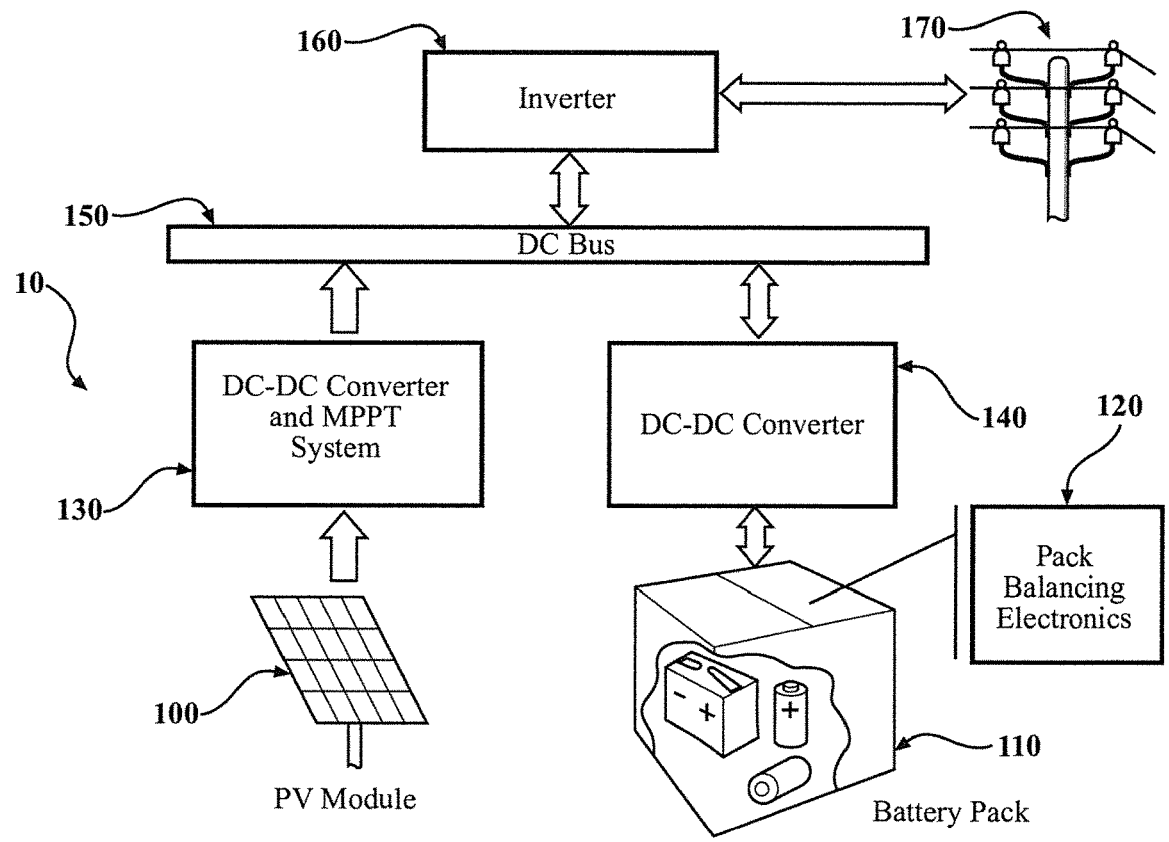
FIG. 1 is a schematic of an exemplary photovoltaic farm topology according to a prior art system.
Figure 2:
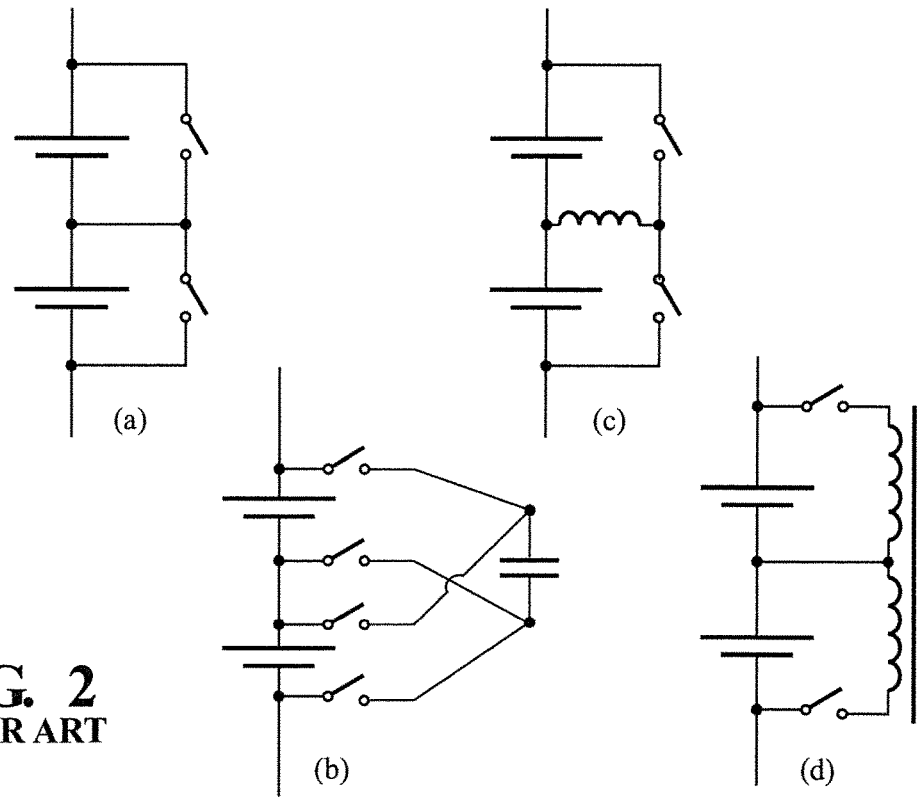
FIG. 2A is a shunt resistor circuit diagram of a battery pack balancing circuit according to a prior art system.
FIG. 2B is a "flying capacitor" circuit diagram of a battery pack balancing circuit according to a prior art system.
FIG. 2C is a cell-to-cell DC-DC conversion circuit diagram of a battery pack balancing circuit according to a prior art system.
FIG. 2D is a pack-level DC-DC conversion circuit diagram of a battery pack balancing circuit according to a prior art system.
Figure 3:
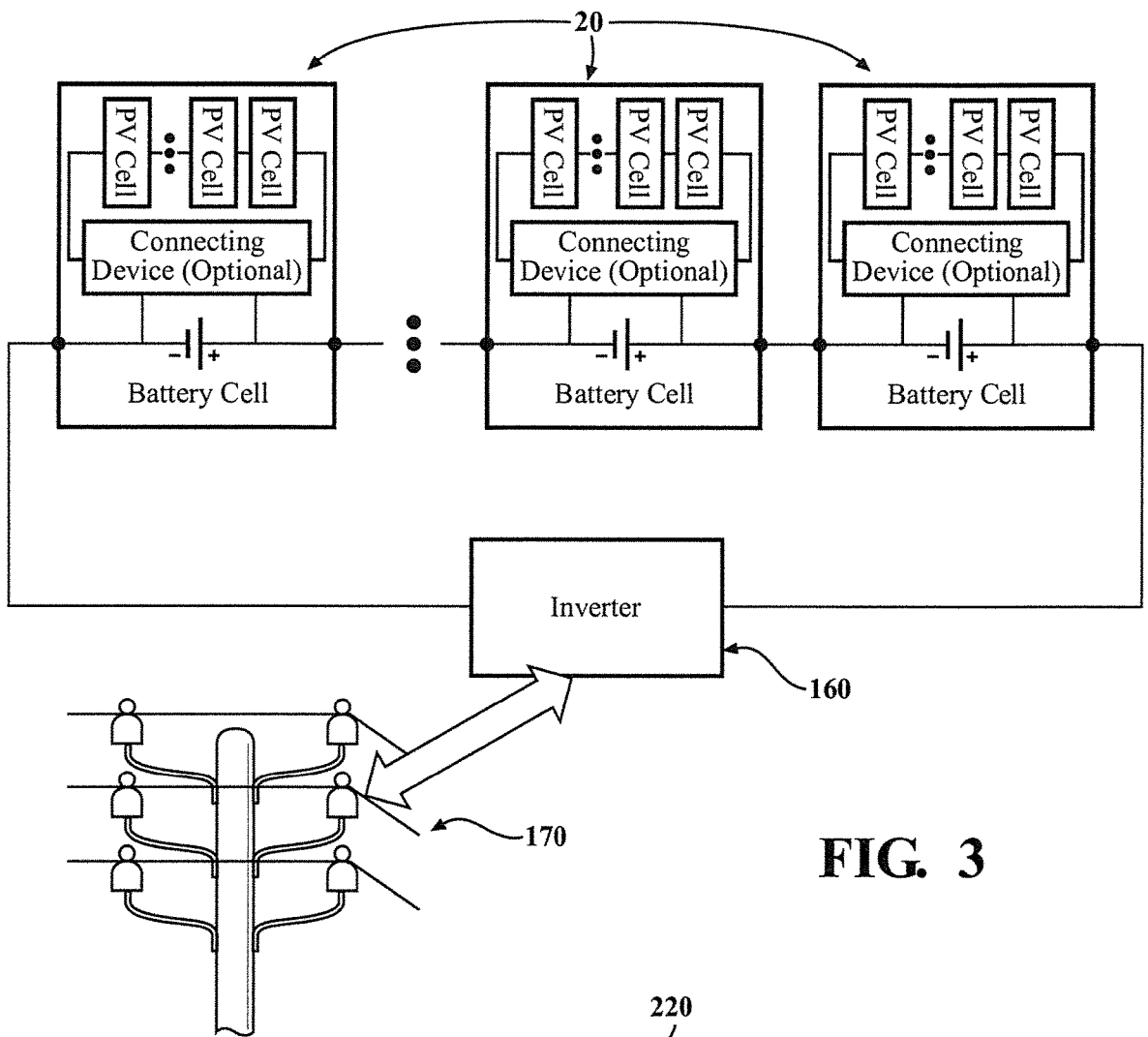
FIG. 3 is a schematic of a string of hybrid photovoltaic/storage cells connected to an AC grid via an inverter according to an embodiment of the present invention.

The present invention presents an approach for integrating battery storage into PV farms: one that considerably reduces the cost of the power electronics needed for integration as compared to the prior art approach of FIG. 1. FIG. 3 is a schematic of an integration topology for an embodiment that incorporates certain elements of the photovoltaic (PV) energy storage system according to the present invention. Not all such elements are required for all versions or embodiments. The embodiment may have plurality of hybrid PV/storage cells 20 i.e. hybrid cells connected in series to form a hybrid string. This string is operable to generate DC electrical power and can be electrically coupled to an inverter 160. The inverter 160 converts DC electrical power into AC electrical power. The non-limiting examples of the inverter 160 may be an off-the-grid inverter or a grid tie-in inverter.

The electric power output of the hybrid string can thus be fed into a grid 170 via a solar inverter. The grid 170 may be a distribution grid, public power grid or a local network.

Figure 4:
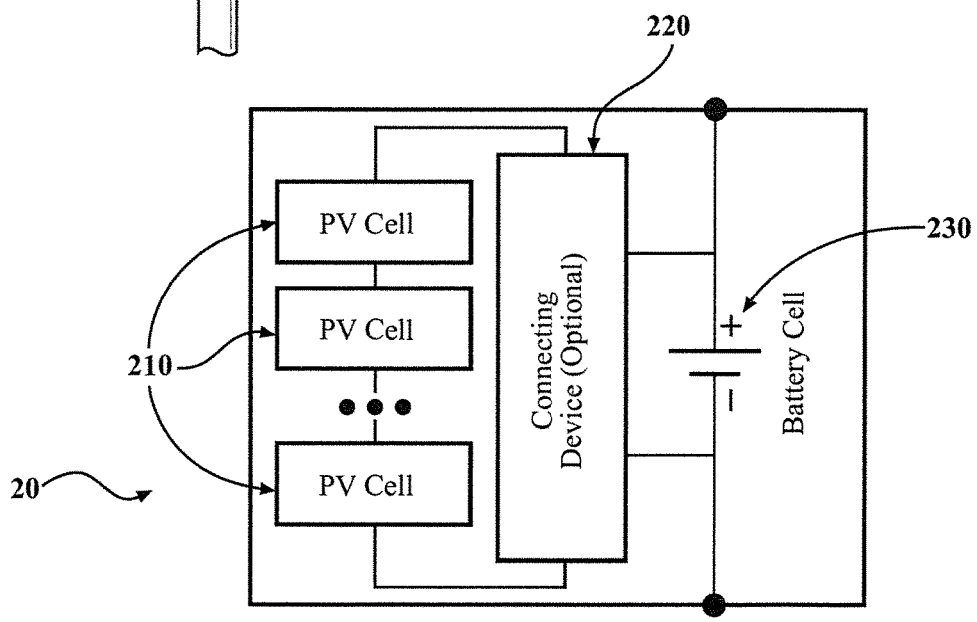
FIG. 4 is a detail of a hybrid photovoltaic/storage cell showing connection between photovoltaic cell(s) and an electrochemical energy storage battery according to an embodiment of the present invention.
Figure 5:
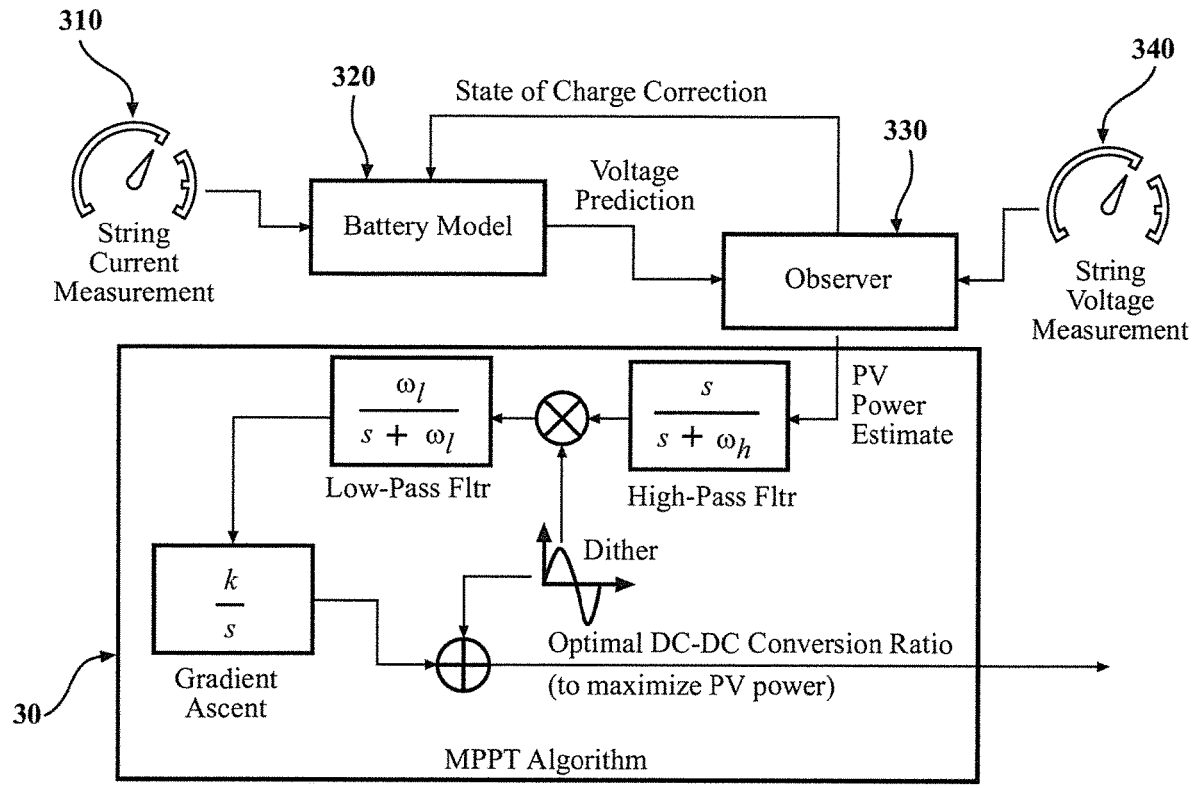
FIG. 5 is a schematic of an embodiment of a MPPT algorithm according to the present invention.

FIG. 4 is a detail of a hybrid cell 20 according to one embodiment of the present invention. A hybrid PV/storage cell 20 i.e. hybrid cell is formed by a parallel connection between a power storage device 230 and a solar power generating unit 210. The solar power generating unit 210 may have plurality of solar power generating units connected in parallel and/or series. Similarly, the power storage device 230 may be a battery pack and the battery pack may have a single or multiple battery cells. The solar power generating unit 210 may be a photovoltaic (PV) cell, a solar cell, and/or a solar panel.

In some embodiments, the charge in every power storage device 230 may be replenished by a small string of solar power generating units 210 attached to the power storage device through a "connecting device" 220. The connecting device 220 may be a DC-DC converter that performs photovoltaic MPPT directly on the small string of PV cells, thereby achieving a high level of MPPT granularity compared to the prior art PV farms. In some embodiments, the connecting device 220 may be a DC-to-DC converter or a buck-boost converter. Alternatively, the connecting device 220 is omitted, and the small string of solar power generating units 210 can feed power into the corresponding battery cell 230 directly. Omitting the connecting device 220 may cause some loss of control authority. In particular, the use of the integrated system's batteries for demand response may become somewhat coupled with the adjustment of system voltage for MPPT purposes.

Some embodiments may have a maximum-power-point tracking (MPPT) controller operable to implement an extremum-seeking algorithm. This algorithm adjusts a DC-DC conversion ratio of the DC-DC converter between the solar power generation unit(s) 210 and the power storage device 230 to optimize an output of the hybrid cells 20 and a voltage output of each of the hybrid cells 20. Alternatively, this algorithm may also adjust the electric power converted by the inverter to achieve MPPT.

Because the present invention uses fewer components, the cost of the power electronics in this topology for certain embodiments may be much lower than the traditional integration topologies according to the prior art system. Furthermore, the topology according to the present invention has at least two additional advantages. First, this proposed topology is globally, asymptotically stable in the sense that any initial discrepancies in the battery state of charge (SOC) among cells in the hybrid string from equilibrium are inclined to asymptotically diminish to zero. Second, the time needed for this self-balancing action is independent of the overall string length, which enables assembly of high-voltage hybrid Photovoltaic (PV)/Electrochemical Energy Storage (EES) (i.e. PV/EES) strings. These advantages are achieved through the system-level integration of elementary devices with complementary properties.

According to one embodiment of the present invention, a method for operating a photovoltaic energy storage system may have the steps of (a) providing a plurality of hybrid cells 20, and generating a DC electrical power using the solar power generating units 210; (b) connecting the solar power generating unit 210 and the power storage device 230 of each hybrid cell 20 in parallel; (c) transferring the DC electrical power from the solar power generating unit 210 to the power storage cell 230 and connecting the power storage devices 230 of the hybrid cells 20 in series; and (d) connecting an inverter 160 to the series of power storage devices 230 and transferring the DC electrical power from the series of power storage devices 230 to the inverter 160.

The solar power generating unit 210 according to some embodiments may have a plurality of solar power generating units and the method may have a further step of connecting the plurality of solar power generating units in series and/or parallel. Another embodiment of the method may have a step of selecting the solar power generating unit 210 from the group consisting of a photovoltaic cell, a solar cell, and a solar panel. Certain embodiments may have a step of connecting the PV energy storage system to a distribution grid, a public power grid, or a local network. Some methods may include a step of selecting the inverter 160 from the group consisting of an off-the-grid inverter and a grid tie-in inverter. A step in the method may provide a battery pack as the power storage device 230 and the battery pack may comprise multiple battery cells.

Yet another method may have a step of providing a connecting device 220 and connecting the solar power generation unit 210 to the power storage device 230 through the connecting device 220. The connecting device 220 may be a DC-DC converter, such as a buck-boost converter. Some embodiments may have a step of directly connecting the solar power generating unit 210 with the power storage device 230. Yet other methods may have a step of connecting the solar power generating unit 210 directly with the power storage device 230 without a connecting device 220.

A method of the present invention may also have the steps of (a) providing a maximum-power-point tracking (MPPT) controller operable to implement an extremum-seeking algorithm; (b) measuring a current generated by the series of plurality of hybrid cells and a voltage output of each hybrid cell or the series of plurality of hybrid cells; (c) communicating the current generated and the voltage output to the controller; (d) adjusting a DC-DC conversion ratio of the DC-DC converter between the solar power generation unit and the power storage device by the extremum-seeking algorithm; and (e) optimizing an output of the hybrid cell based on the current and the voltage by the extremum-seeking algorithm.

Now, the global, asymptotic stability of the present invention is first proven mathematically, and in this process one possible battery model of the present invention is introduced. Then the PV array modeling and parameter estimation process is discussed. This is followed by the results section, where the simulation results are presented by verifying the insights gained mathematically regarding the system. One method of estimating the PV generated current and/or power is provided below along with the simulation results.

Proof of Global Asymptotic Stability of the Hybrid PV/EES Cell

Consider a $k^{th}$ hybrid cell in a string of M identical hybrid cells 20 as shown in FIG. 3. The Lithium (Li)-ion cell in this hybrid cell is modeled using a first-order equivalent-circuit (EC) model that contains an ideal voltage source, representing the open circuit voltage (OCV) of the cell, connected in series with the internal resistance $R_o$. The simplicity of this model provides insight into the battery pack self-balancing behaviors. FIG. 4 is a detail of a hybrid photovoltaic/storage cell 20 showing connection between the photovoltaic cell(s) 210 and the electrochemical energy storage battery 230 according to an embodiment of the present invention.

Figure 6:
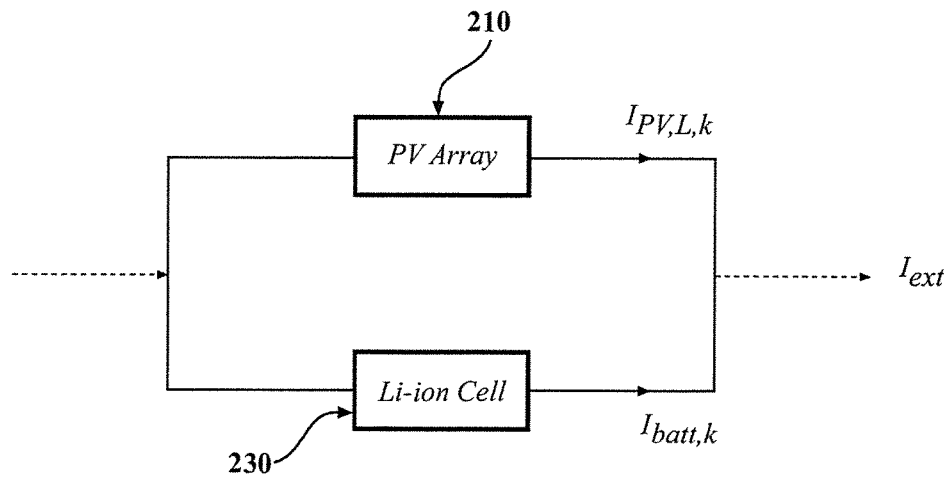
FIG. 6 is a schematic of hybrid cell topology without a connecting device according to one embodiment the present invention.
Figure 7:
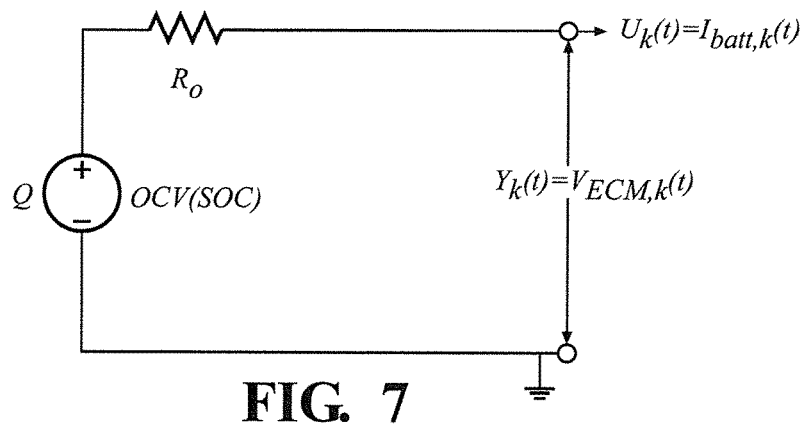
FIG. 7 is a first-order equivalent-circuit model of a Lithium-ion battery/cell according to the present invention.

FIG. 6 provides a first-order equivalent-circuit (EC) model and FIG. 7 provides a battery model of the hybrid photovoltaic/storage cells 20. As shown in FIG. 6, let the external load current be $I_{ext}$. This current is applied equally to all hybrid cells in a given string. The currents drawn from the Li-ion battery cell 230 and PV array 210 are $I_{batt,k}$ and $I_{PV,L,k}$ respectively, resulting in the relation: $I_{PV,L,k}+I_{batt,k}=I_{ext}$. The state space equations of the battery equivalent-circuit (EC) model may thus be written as:

$$\dot{x}_k = (S\dot{O}C) = \frac{I_{batt,k}}{Q} = \frac{I_{PV,L,k} - I_{ext}}{Q} \quad (1a)$$

$$V_{ECM,k} = OCV(x_k) - I_{batt,k}R_o = OCV(x_k) + (I_{PV,L,k} - I_{ext})R_o \quad (1b)$$

where $x_k$ is the state of charge (SOC) of the ideal voltage source of charge capacity Q, and $V_{ECM,k}$ is the output voltage across the cell.

At equilibrium, the state of charge (SOC) does not change with the time. Thus Eqns. (1a and 1b) yield:

$$\bar{I}_{batt,k}=0 \Leftrightarrow I_{ext}-\bar{I}_{PV,L,k}=0 \quad (2a)$$

$$\bar{V}_{ECM,k}=OCV(\bar{x}_k) \Leftrightarrow \bar{x}_k=OCV^{-1}(\bar{V}_{ECM,k}) \quad (2b)$$

where quantities with the accented bar (—) represent values at equilibrium. As shown in FIG. 6, the voltages across the PV array 210 and Li-ion cell 230 are equal since they are connected in parallel without a connecting device, which gives the relation:

$$V_{PV,k} = V_{ECM,k} \quad (3)$$
$$= OCV(x_k) + (I_{PV,L,k} - I_{ext})R_o$$

where $V_{PV,k}$ is the PV array generated terminal voltage.

This PV generated voltage has a one-to-one mapping with the PV generated current, $I_{PV,L,k}$, and is a monotonically decreasing function of $I_{PV,L,k}$. This is reflected in the characteristics current-voltage (I-V) curve of any PV array. If $V_{PV,k}^*$ is obtained by shifting the current axis of $V_{PV,k}(I_{PV,L,k})$ from the origin towards a positive direction by an amount equal to the external current $I_{ext}$, then $V_{PV,k}^*$ is a monotonically decreasing, one-to-one function of $I_{PV,L,k} - I_{ext}$. Use of this new function along with Eqn. (3), will yield:

$$V_{PV,k}^*(I_{PV,L,k}-I_{ext})=OCV(x_k)+(I_{PV,L,k}-I_{ext})R_o \Rightarrow OCV(x_k)=V_{PV,k}^*(I_{PV,L,k}-I_{ext})-(I_{PV,L,k}-I_{ext})R_o \quad (4)$$

In a Li-ion cell, Open-circuit Voltage (OCV) is a monotonically increasing function of the state of charge (SOC). In Eqn. (4), the left hand side (lhs) is a monotonically increasing function with respect to (wrt) $x_k$, whereas the right hand side (rhs) is a monotonically decreasing function with respect to (wrt) $I_{PV,L,k}-I_{ext}$. Thus, if $x_k$ increases, $I_{PV,L,k}-I_{ext}$ has to decrease for the equality in Eqn. (4) to be true. With this knowledge, the inequalities in Eqn. (5) are obtained:

$$x_k > \bar{x}_k \Leftrightarrow OCV(x_k) > OCV(\bar{x}_k) \Rightarrow (I_{PV,L,k}-I_{ext}) < 0, [\because Eqn.(2a)] \quad (5a)$$

$$x_k < \bar{x}_k \Leftrightarrow OCV(x_k) < OCV(\bar{x}_k) \Rightarrow (I_{PV,L,k}-I_{ext}) > 0, [\because Eqn.(2a)] \quad (5b)$$

Using Eqn. (5) with Eqn. (1a), the following conditions are obtained:

$$x_k > \bar{x}_k \Leftrightarrow \dot{x}_k < 0, \; x_k < \bar{x}_k \Leftrightarrow \dot{x}_k > 0 \quad (6)$$

Now consider a Lyapunov function $V(x_k) = (x_k - \bar{x}_k)^2/2$. This function is continuously differentiable in the domain of real numbers, $V(\bar{x}_k) = 0$, $V(x_k) > 0$, $\forall x_k \neq \bar{x}_k$, and $V(x_k \to \infty) \to \infty$. Derivative of the Lyapunov function then yields:

$$\dot{V} = (x_k - \bar{x}_k)\dot{x}_k \Rightarrow \dot{V} < 0, [\text{Using Eqn.}(6)] \quad (7)$$

This proves that the system is globally, asymptotically stable, and that any deviation of the state of charge (SOC) from the equilibrium will always converge to the equilibrium value given by Eqn. (2b). Since k is arbitrary, this equilibrium is achieved by all the battery cells in a hybrid string. In other words, the hybrid PV/battery string is globally, asymptotically self-balancing.

Analytical Expression for the Decay Time Constant

Any initial state of charge (SOC) ($\neq \bar{x}_k$) of the system of the present invention in Eqn. (1) decays back to the equilibrium value. In this section, an analytical expression for the decay time constant is derived using a first order Taylor series expansions of the OCV-SOC function and the PV array's I-V characteristics curve around the equilibrium. Allowing small perturbations in the state and an input from the equilibrium, given by $I_{PV,L,k} = \bar{I}_{PV,L,k} + \delta I_{PV,L,k}$ and $x_k = \bar{x}_k + \delta x_k$ causes the output voltage to perturb to $V_{ECM,k} = \bar{V}_{ECM,k} + \delta V_{ECM,k} = \bar{V}_{PV,k} + \delta V_{PV,k}$. Following is obtained by substituting these relations in Eqn. (1) and using Eqn. (3):

$$\delta \dot{x}_k = \frac{(\bar{I}_{PV,L,k} + \delta I_{PV,L,k} - I_{ext})}{Q} \quad (8a)$$

$$\bar{V}_{ECM,k} + \delta V_{ECM,k} = \bar{V}_{PV,k} + \delta V_{PV,k} = OCV(\bar{x}_k + \delta x_k) + (\bar{I}_{PV,L,k} + \delta I_{PV,L,k} - I_{ext})R_o \quad (8b)$$

Taking a first order Taylor series expansion of the Open-circuit Voltage (OCV) with respect to the state of charge (SOC) around the equilibrium and using the equilibrium relations of Eqn. (2) results in:

$$\delta \dot{x}_k = \frac{\delta I_{PV,L,k}}{Q} \quad (9a)$$

$$\delta V_{ECM,k} = \delta V_{PV,k} = \left.\frac{dOCV}{dx_k}\right|_{\bar{x}_k} \delta x_k + \delta I_{PV,L,k} R_o \quad (9b)$$

where $$\left.\frac{dOCV}{dx_k}\right|_{\bar{x}_k} = \left.\frac{dOCV}{dSOC}\right|_{\overline{SOC}} \equiv \gamma$$

is a slope of the OCV-SOC curve evaluated at the equilibrium state of charge (SOC), and is a positive quantity owing to the monotonically increasing nature of the curve. Similarly, a Taylor series expansion of the I-V characteristics curve of the PV array yields:

$$\delta V_{PV,k} = -\eta \delta I_{PV,L,k}, \quad \eta \equiv -\left.\frac{dV_{PV,k}}{dI_{PV,L,k}}\right|_{\bar{I}_{PV,L,k}} > 0 \quad (10)$$

Using Eqn. (10) in Eqn. (9b) to solve for $\delta I_{PV,L,k}$, results in:

$$\delta I_{PV,L,k} = -\frac{\gamma}{(\eta + R_o)}(\delta x_k) \quad (11)$$

Substituting the expression for $\delta I_{PV,L,k}$ from Eqn. (11) in Eqn. (9a), results in:

$$\delta \dot{x}_k = -\frac{\gamma}{Q(\eta + R_o)}\delta x_k \quad (12)$$

Equation (12) shows the form of the negative eigenvalue associated with the dynamical equation that describes the state of charge (SOC) trajectory over time. This can be solved analytically to obtain:

$$\delta x_k(t) = \exp\left(-\frac{\gamma}{Q(\eta + R_o)}t\right)\delta x_{k,init} \quad (13)$$
$$= \exp\left(-\frac{t}{\tau}\right)\delta x_{k,init}$$

where $\tau = Q(\eta + R_o)/\gamma$ is an exponential decay time constant of the state of charge (SOC) discrepancy from the equilibrium, and $\delta x_{k,init}$ is the initial difference of the state of charge (SOC) from the equilibrium. The expression for $\tau$ and Eq. 13 also provides some design rules for sizing the power storage device in some embodiments of the hybrid cell. For example, if it is desired that the self-balancing (say the final SOC perturbation is one-hundredth of initial perturbation) time for a Lithium Iron Phosphate (LFP) cell is to be two hours, then from the time constant expression it can be calculated that the charge capacity of the cell should be approximately 1.9 A-hr.

The discussion above provides a number of insights into the behavior of this hybrid system such as: (i) The results in Eqns. (7) and (13) show that the state of charge (SOC) of the Li-ion cell will always converge back to the equilibrium value; (ii) The time needed for self-balancing in a string of M identical hybrid units is independent of the string length, since τ does not depend on M. This enables the assembly of high-voltage strings by avoiding a classical difficulty with such strings (namely, the fact that they often require excessive balancing times when more traditional balancing topologies are used); (iii) The decay time constant is dependent on the cell parameters, Q and $R_o$. Although, self-balancing occurs in the presence of battery parameter heterogeneity, its speed depends on the parameter values as follows. First, a higher value of the charge capacity Q increases τ, thereby slowing down the self-balancing speed. Second, a high internal resistance $R_o$ also slows down the state of charge (SOC) convergence to the equilibrium; (iv) The location of the equilibrium operating point (which is governed by the magnitude of $I_{ext}$ and slopes of the SOC-OCV curve and the I-V curve) affects the convergence speed. An operating point where the PV array's I-V curve is flatter (larger η, since η is the inverse of the slope of the I-V curve) results in a longer time to self-balance and vice versa. Similarly, a battery cell with a flatter SOC-OCV curve (smaller γ) will lead to a longer time for self-balancing and vice versa; and (v) The value of η can be altered by increasing or decreasing the number of parallel strings in the PV array of a hybrid unit, thereby changing the self-balancing speed. The next section verifies these insights in a simulation.

Results

Simulation studies are used to analyze and verify the insights gained from the stability proof in the previous section. The so-called single diode model of a PV array is used along with an equivalent-circuit (EC) model of a Lithium Iron Phosphate (LFP) cell with a capacity of 4.5 Ampere-hour (Ah) to develop the hybrid unit model in MATLAB/Simulink. A scaled model of the PV array is derived based on available information from the PV manufacturers' datasheets. Information regarding various parameters along with their values in the standard test conditions (STC) are given in Table I for two different commercially available PV arrays, namely the Kyocera KC200GT (54 cells per module) and Solarex MSX60 (36 cells per module). Detailed description of the PV array model is provided below, along with a discussion on model scaling and one possible method for the parameter identification.

TABLE I

Parameter Valves from PV Array Manufactures' Datasheets

| Parameters | KC200GT | MSX60 |
|---|---|---|
| MPP current, $I_{mp}$ | 7.61 A | 3.5 A |
| MPP voltage, $V_{mp}$ | 26.3 V | 17.1 V |
| Experimental maximum power, $P_{max, e}$ | 200.143 W | 60 W |
| Short circuit current, $I_{SC}$ | 8.21 A | 3.8 A |
| Open circuit voltage, $V_{oc}$ | 32.9 V | 21.1 V |
| Temperature coefficient of $V_{oc}$, $K_v$ | −0.1230 V/K | −0.08 V/K |
| Temperature coefficient of $I_{sc}$, $K_I$ | 0.0032 A/K | 0.00065 A/K |
| $N_{s, PV}$ | 54 | 35 |
| $N_{p, PV}$ | 1 | 1 |

Figure 8:
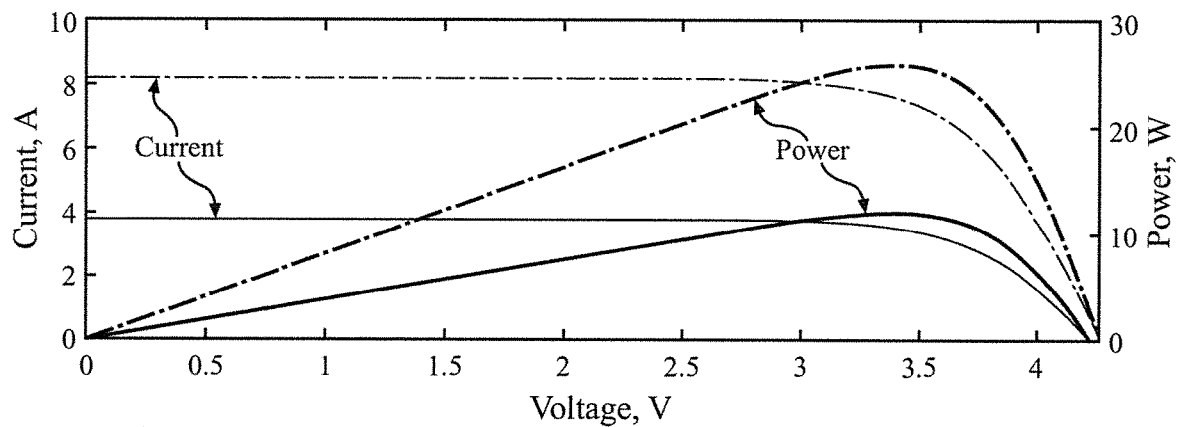
FIG. 8 is a graph of the power versus voltage (P-V) and current versus voltage (I-V) characteristics of a Lithium-ion battery/cell.
Figure 9:
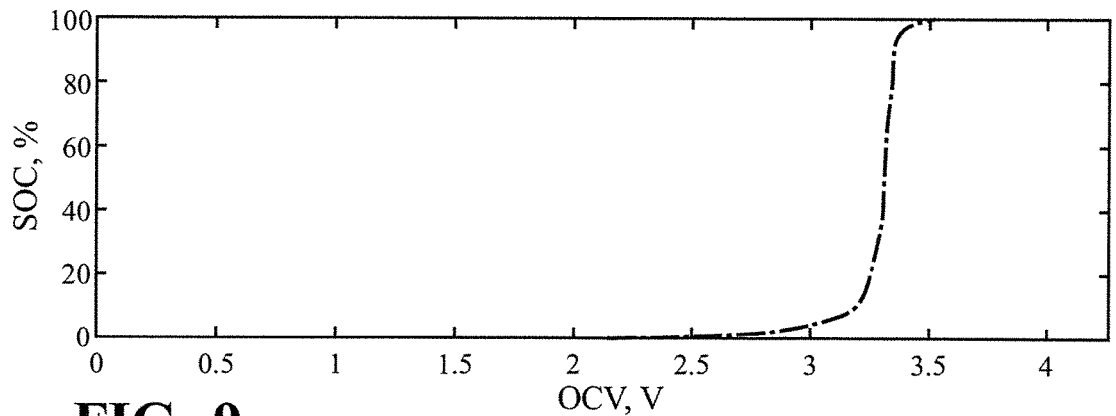
FIG. 9 is a graph of a state of charge (SOC) versus Open-circuit Voltage (OCV) curve of a Lithium-ion battery/cell.

It can be calculated from Table I that the Maximum Power Point (MPP) voltage for a single cell PV array is ~0.49 V. The Open-circuit Voltage (OCV) of the Li-ion cell ranges from 2.1472 V at 0% state of charge (SOC) to 3.5201 V at 100% state of charge (SOC). The hybrid cell, in its simplest rendition without any connecting device, is constructed in a way such that the Maximum Power Point (MPP) voltage of the array lies within the Open-circuit Voltage (OCV) range of the Li-ion cell. This allows using six or seven PV cells in series in the hybrid units connected in parallel with a Li-ion cell. However, since the Li-ion cells are intended for mitigating intermittency issues with the PV array, it is more justifiable to keep it at a higher state of charge (SOC). Therefore, in one embodiment of the present invention, a model of the hybrid PV/EES cell is developed that connects seven PV cells in series. This construction gives a combination of power versus voltage (P-V) and current versus voltage (I-V) characteristics curves, and SOC-OCV relation as shown in FIGS. 8 and 9. In FIG. 8, the dash-dotted lines represent curves obtained using KC200GT cells, while the solid lines represent curves obtained using MSX60 cells. This results in a Maximum Power Point (MPP) voltage of ~3.39 V, which allows the Li-ion cells to be operated at ~97% state of charge (SOC). It should be noted that the proposed set-up of the hybrid unit allows the PV array to operate at the Maximum Power Point (MPP), but there is no active control towards achieving MPPT. The rest of this section verifies and discusses the insights gained in the previous section through simulation studies.

Self-Balancing Action in Simulation

Figure 10:
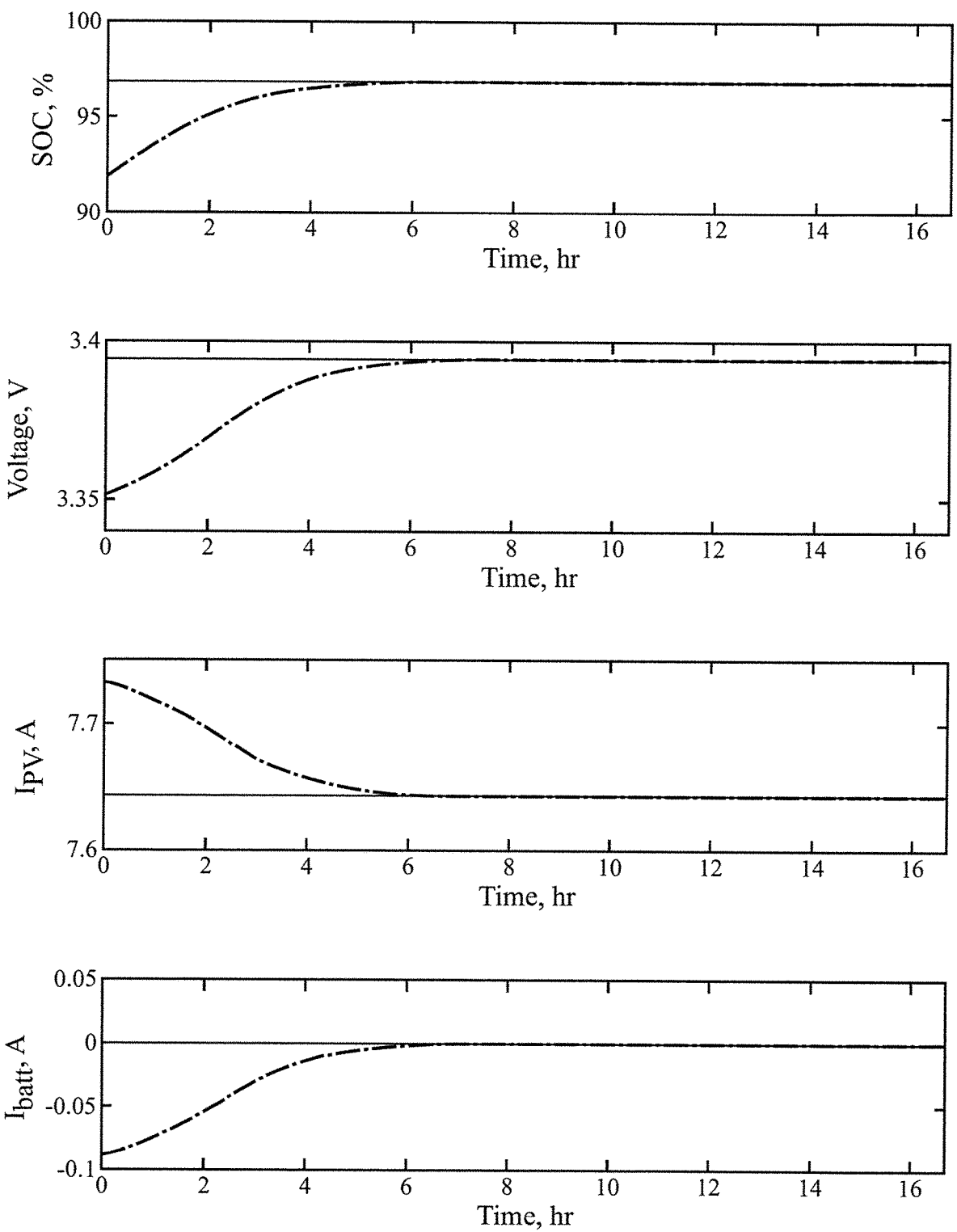
FIG. 10 provides graphs of the variation of state of charge (SOC), voltage, Photovoltaic (PV) current, and battery current with respect to time for a hybrid Photovoltaic (PV)/Electrochemical Energy Storage (EES) with PV cells from a scaled PV array KC200GT.
Figure 11:
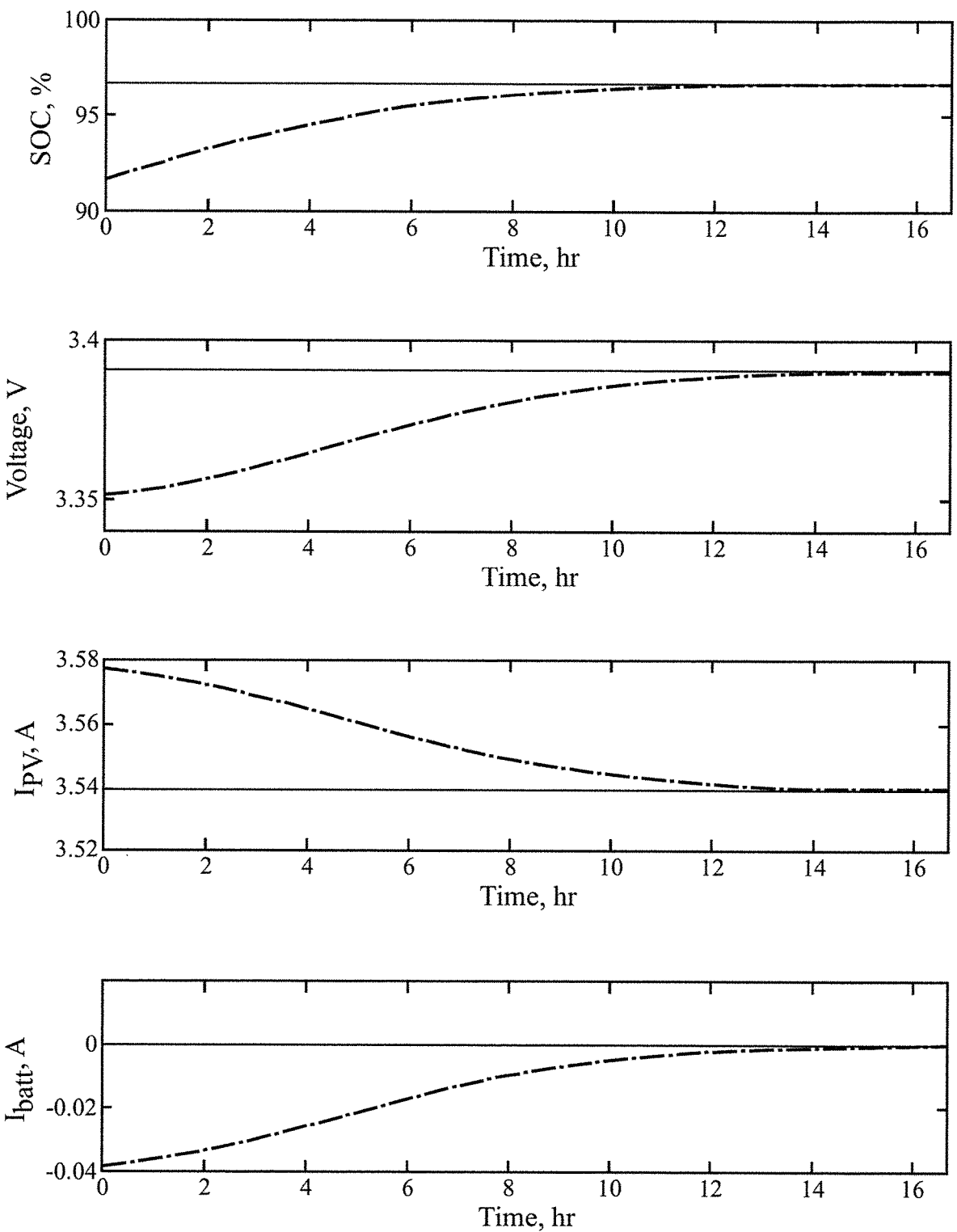
FIG. 11 provides graphs of the variation of state of charge (SOC), voltage, photovoltaic (PV) current, and battery current with respect to time for a hybrid Photovoltaic (PV)/Electrochemical Energy Storage (EES) with PV cells from a scaled PV array MSX60.

Constant external current may be applied to a single hybrid PV/EES unit, such that the corresponding voltage load equals the Maximum Power Point (MPP) voltage. An initial state of charge (SOC) difference of 5% from the equilibrium value may be kept, and the hybrid unit may be simulated using PV cells from both the arrays given in Table I. The variation of state of charge (SOC), voltage, PV current (same as $I_{PV,L,k}$), and battery current (same as $I_{batt,k}$) with time is shown in FIGS. 10 and 11 for the arrays KC200GT and MSX60, respectively. The solid lines represent equilibrium values and the dash dotted lines represent the time evolution of the signals shown in the graph. As stated earlier, the state of charge (SOC) of the battery and hence the voltage, gradually approaches the equilibrium values, thereby decaying the current input to the battery. The hybrid unit containing PV cells from the KC200GT array enables this self-balancing action to occur much faster than MSX60, due to its higher current generating capabilities, as seen in FIGS. 8 and 9.

String Level Self-Balancing

Figure 12:
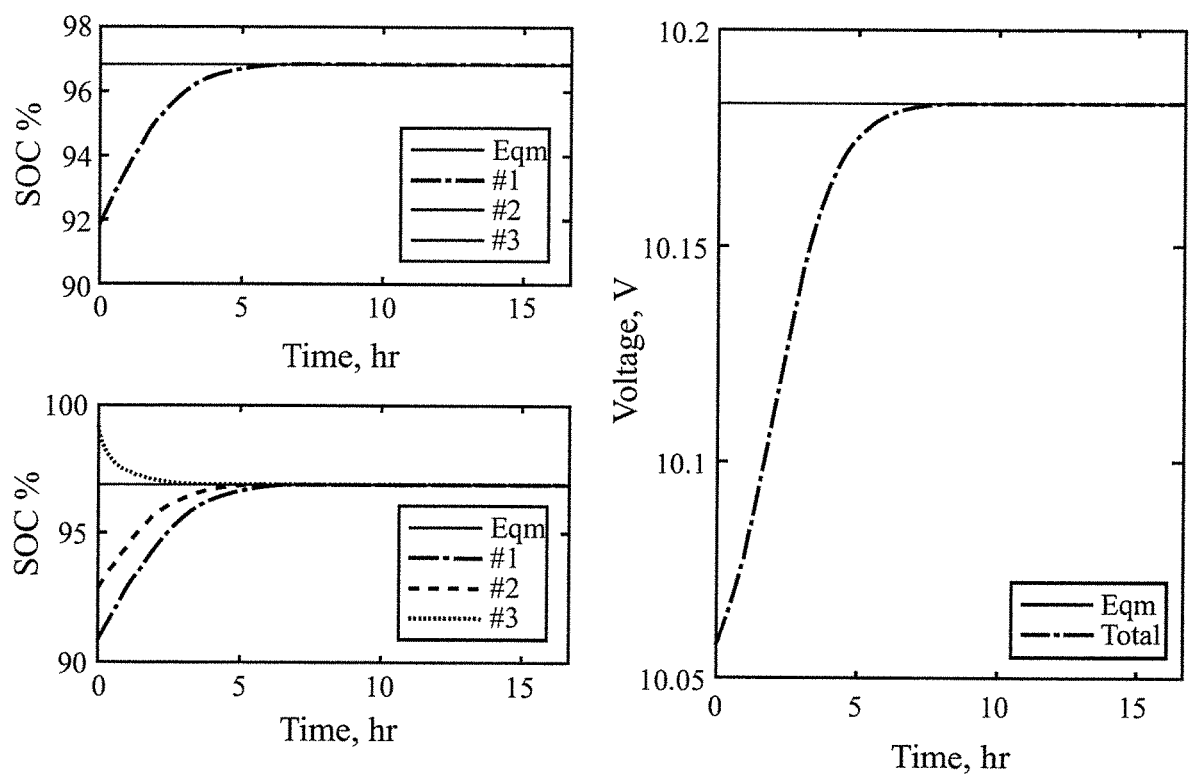
FIG. 12 is a graphical representation of a simulation of a hybrid string with three cells in series.

A string consisting of three hybrid PV/EES units may be simulated to analyze its self-balancing behavior. The KC200GT variant of the PV cells may be considered for this scenario, as well as for the rest of the discussion. In the first case, all Li-ion cells in the string are initialized from the same state of charge (SOC), which is 5% less than the equilibrium value. The variation of SOCs for individual cells is seen in the top left subplot of FIG. 12, where, in the figure legend, Eqm represents equilibrium values, #1, #2, and #3 represent hybrid Unit Nos. 1, 2 and 3 respectively. The time required for the initial 5% difference in the state of charge (SOC) to decay to 2.5% from the equilibrium is compared for a single hybrid unit and the three-unit series string described here, and is found to be the same 1.4317 hours. In other words, the equilibrium values, #1, #2, and #3 in the top left subplot of FIG. 12 overlap with each other. This shows that a single hybrid unit balances within the same time as a string with multiple cells as long as all the cells are identical and had the same initial state of charge (SOC), which demonstrates the independence of self-balancing time on the hybrid string's length. The bottom left subplot of FIG. 12, shows that the time required for self-balancing of the entire string is constrained by the unit whose initial state of charge (SOC) is farthest from the equilibrium value. In this scenario, the initial state of charge (SOC) of Unit No. 1 is 10% away from equilibrium value, and is the farthest. Eqn. (13) also corroborates this behavior, where it is seen that $\delta x_k(t)$ is dependent on the initial state of charge (SOC) difference from the equilibrium and the decay time constant $\tau$, which is independent of the string length. The total output voltage of the string converges to the equilibrium value as well, which in this case is addition of the voltages of individual units.

Effect of Li-Ion Cell Parameter Heterogeneity

Figure 13:
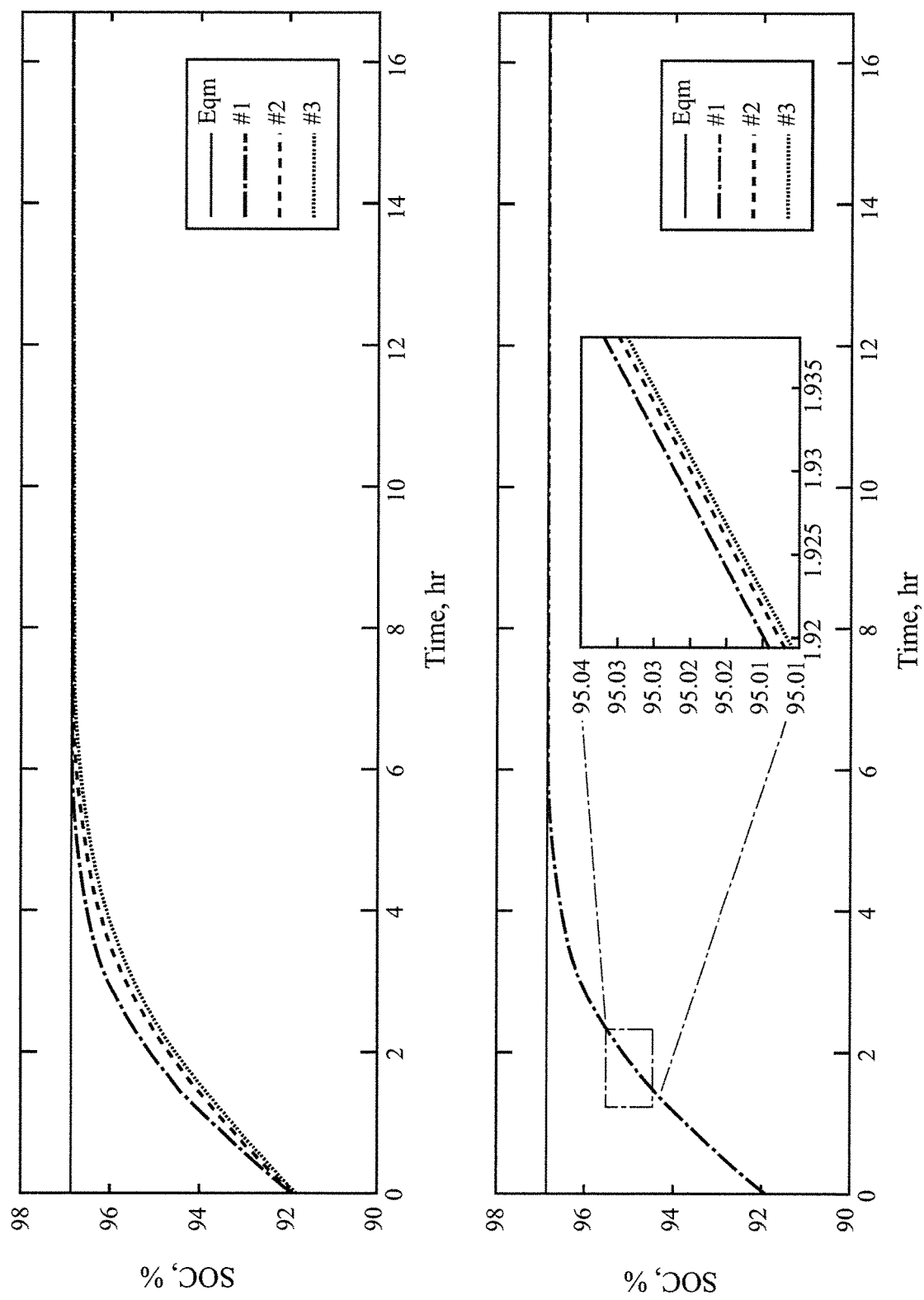
FIG. 13 provides graphs of the effect of Lithium-ion battery parameter heterogeneity on the string self-balancing.

Typical series string balancing methods such as switched capacitor equalization in a battery pack may induce a state of charge (SOC) and a voltage drift over time in the presence of capacity heterogeneity of the constituent cells, particularly when a unidirectional charging/discharging current is applied extensively. The problem may worsen with the increased string length. The hybrid configuration according to one embodiment of the present invention is found to be self-balancing even with the parameter heterogeneity. The three-cell string may be simulated by increasing the capacity and internal resistance of the Li-ion cells in Unit Nos. 2 and 3 by 20% and 30% respectively from the nominal values, while keeping the initial state of charge (SOC) 5% away from the equilibrium. A cell with higher capacity may have a higher decay time constant $\tau$, and hence a slower convergence speed. Eqn. (1a) shows that for a given input current, a higher value of Q will result in a smaller change in the state of charge (SOC). Therefore, the cell with the highest capacity, which is in Unit No. 3 in this case, takes the longest to approach the equilibrium, as seen in the top subplot of FIG. 13. Similarly, the cell with highest internal resistance (Unit No. 3) may take the longest to reach the equilibrium, since the input current has to overcome more $I^2R$ losses with a larger internal resistance in order to charge the ideal voltage source representing the Open-circuit Voltage (OCV) back to the equilibrium value. The effect of $R_o$ also manifests through the decay time constant $\tau$ in Eqn. (13), where it appears in the numerator of the expression for $\tau$. Thus, a larger $R_o$ may result in a longer time for the initial state of charge (SOC) difference to decay to zero. However as $R_o$ in this simulation is almost two order smaller than $\eta$, its effect on the self-balancing time may not be readily observed in the simulation result shown in the bottom subplot of FIG. 13. A zoomed out section of this curve shows this effect.

Effect of Equilibrium Operating Point

Figure 14:
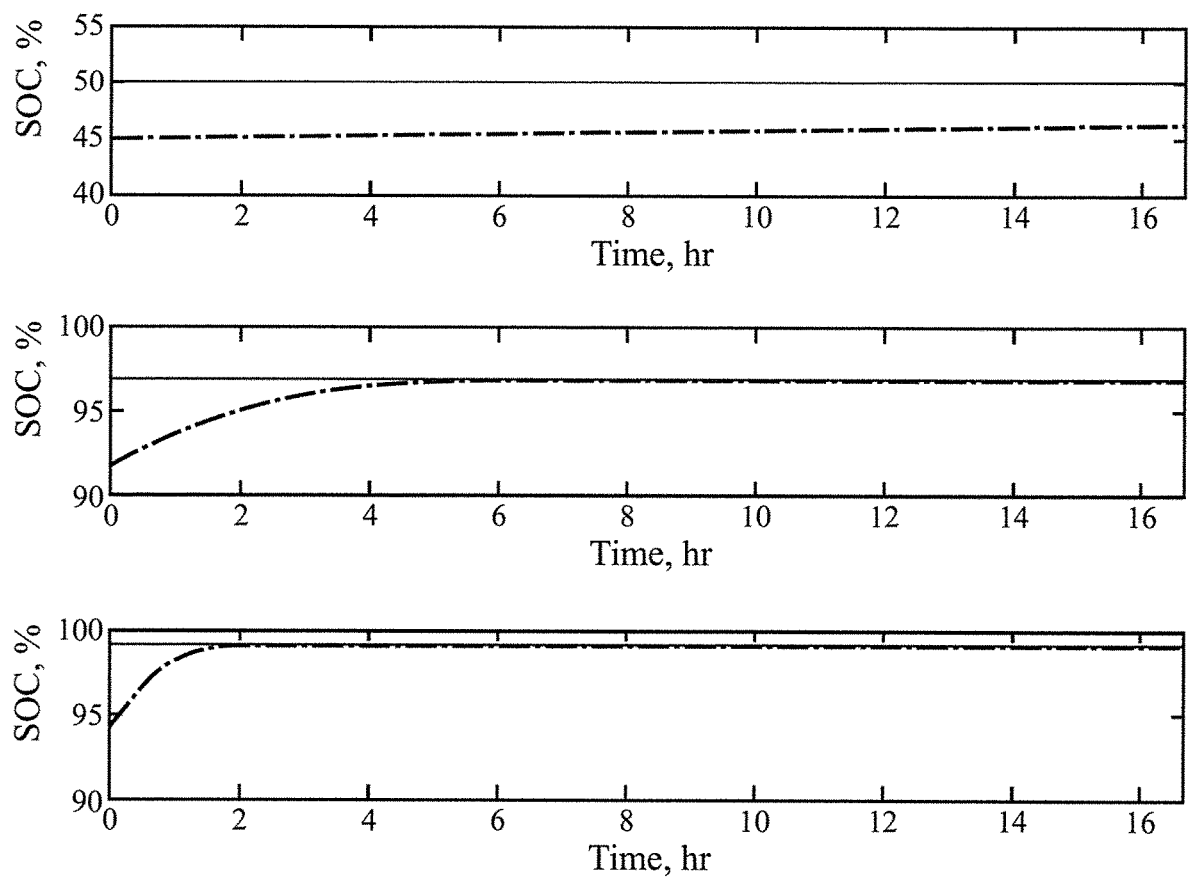
FIG. 14 is a graphical representation of the effect of equilibrium points on the self-balancing speed.

The speed at which self-balancing occurs in this hybrid PV/EES unit may depend on the equilibrium point at which it operates. FIG. 14 shows this effect for three different equilibrium SOCs, namely 50%, 96.85% (MPP for KC200GT), and 99%, while the initial state of charge (SOC) is kept 5% lower than the equilibrium value for each of these cases. The slowest balancing action may occur at 50% equilibrium state of charge (SOC). This may be explained using the I-V characteristics of the PV array shown in FIGS. 8 and 9. At the lower equilibrium state of charge (SOC) of 50%, voltage output is low and the slope of the I-V characteristics curve is small ($\eta$=0.6142). Therefore, for the same voltage difference, balancing current generated by the PV array may be low. In contrast, although the slope at the higher equilibrium state of charge (SOC) of 99% is larger ($\eta$=0.3484), and hence faster balancing time, the external current that can be applied to the unit may become constrained to a lower value. Additionally, it may not be safe to operate the Li-ion cells at such high state of charge (SOC), since Li-ion cells may suffer from the accurate parameter identifiability issue, which may make the model-based state of charge (SOC) estimation inaccurate. Accordingly, operating the cell at SOCs very close to the limits might result in accidental overcharging and thus might damage the cell. The best equilibrium operating point for this current hybrid configuration is the Maximum Power Point (MPP) (SOC=96.85% and $\eta$=0.4457) that strikes a reasonable balance between the self-balancing speed and the current handling capabilities.

Increasing Self-Balancing Speed

Figure 15:
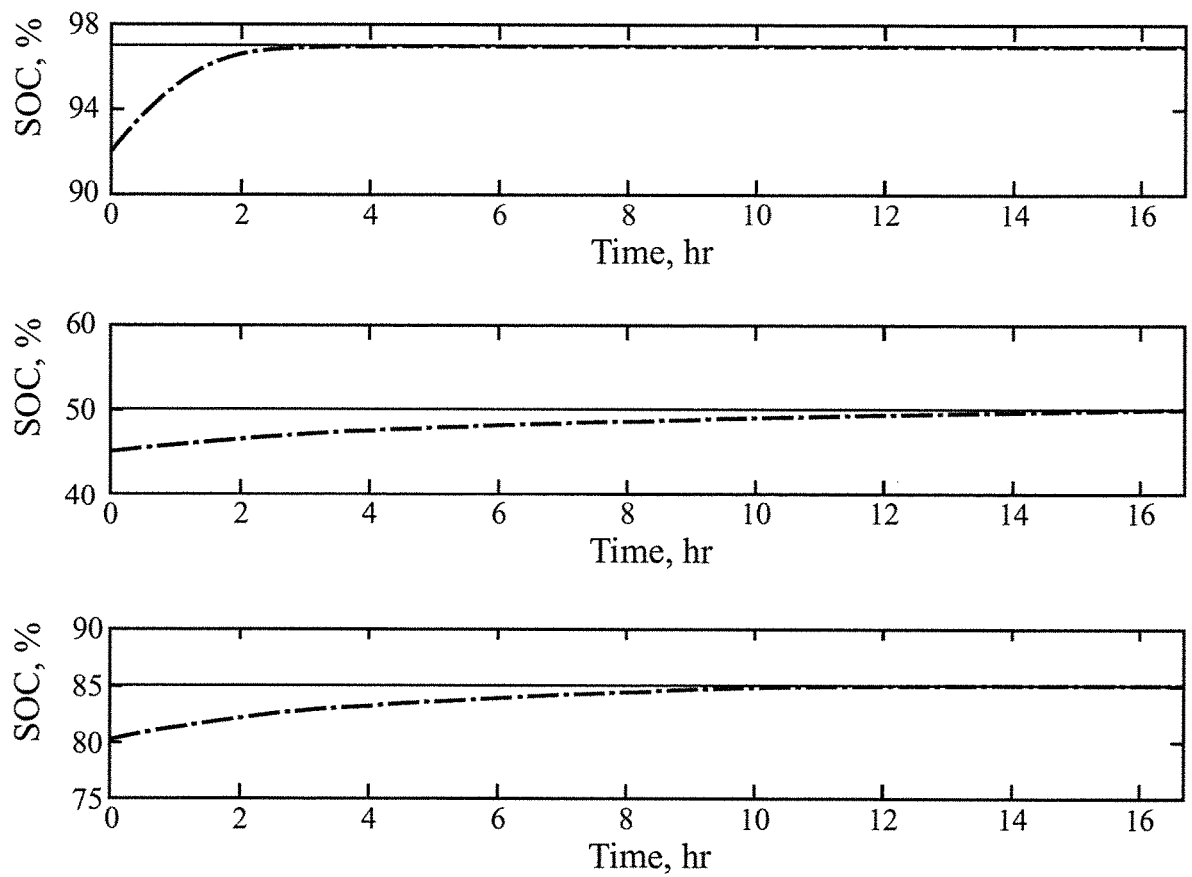
FIG. 15 provides graphs showing self-balancing with the increased parallel strings in a Photovoltaic (PV) array.

The limiting factor for the speed of balancing these hybrid units is the slope of the I-V characteristics curve $\eta$, which dictates the current generated by the PV array for a given voltage. This limitation may be overcome by using multiple PV strings in parallel in each unit. This may increase the current generation range of the PV array keeping the voltage's range same, which may in turn increase the slope of the I-V curve. Three such situations are shown in FIG. 15. The top subplot shows operation of the hybrid unit around the Maximum Power Point (MPP). Two parallel PV strings (KC200GT variant) are used in this case, and the time for the initial 5% difference in the state of charge (SOC) to decay to 2.5% short of equilibrium was found to be 0.7198 hours. Operating the system away from the Maximum Power Point (MPP) may result in a long self-balancing time; however, this may be reduced considerably by using multiple parallel PV strings in a single hybrid unit. For instance, the other two subplots in FIG. 15 show operation at 50% and 85% equilibrium SOCs. The resultant graphs are obtained by simulating the hybrid unit with twelve and nine parallel PV strings respectively.

PV Model and Parameter Identification Single Diode Model of PV Array

Figure 16A:
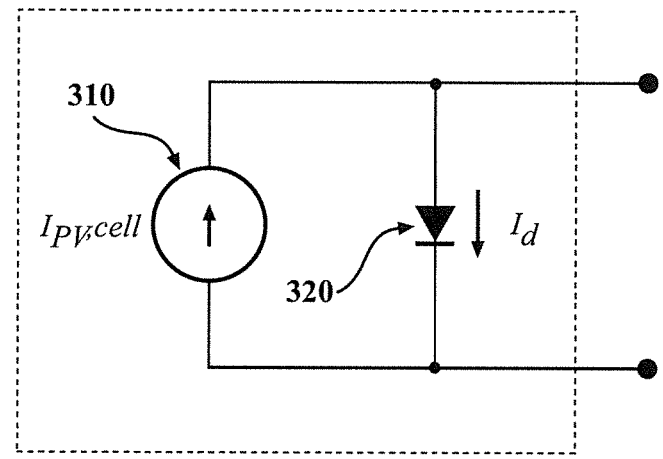
FIG. 16A is an equivalent circuit of a single diode model of an ideal PV cell.
Figure 16B:
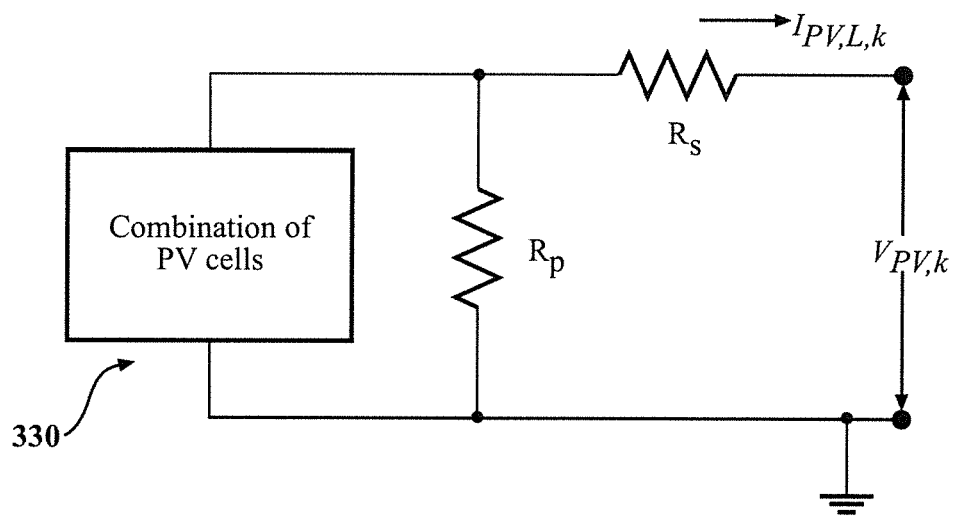
FIG. 16B is an equivalent circuit of a single diode model of a PV array.

A single diode model of the PV array and a possible parameter identification method are discussed here. Irrespective of whatever model of the PV array is chosen, it will always have a monotonically decreasing, one-to-one I-V characteristics curve, which ensures self-balancing in the integrated battery cell. FIG. 16A shows the equivalent circuits of a single diode model of an ideal PV cell and FIG. 16B shows a PV array. The ideal PV cell may consist of a current source 310 that generates current based on the amount of insolation, and a diode 320 that is connected in parallel. However, practical PV arrays have many individual PV cells connected in series to form the high voltage strings, and these strings may be connected in parallel to each other to increase the current. These connections may result in additional losses in the circuit, which may be represented by an equivalent series resistance $R_s$ and a parallel resistance $R_p$, as shown in FIG. 16B. These two resistances may describe the losses in the PV array 330 depending on whether the PV array 330 is operating as a voltage source or current source. Let $I_{PV,L,k}$ represent the load current or the generated current that may be drawn from the PV array of the $k^{th}$ hybrid PV/EES unit, and $V_{PV,k}$ represent the terminal voltage that may be obtained from the PV array when a resistive load is connected across it.

The mathematical relation that describes the I-V characteristics of an ideal PV cell (as shown in FIG. 16A) is given by:

$$I_{PV,ideal} = I_{PV,cell} - \underbrace{I_{0,cell}\left[\exp\left(\frac{qV_{PV,ideal}}{akT}\right) - 1\right]}_{I_d} \quad (14)$$

where,

1. $I_{PV,ideal}$ and $V_{PV,ideal}$ are current and terminal voltage of an ideal PV cell
2. $I_{PV,cell}$ is the current generated by the incident light
3. $I_{0,cell}$ is the reverse saturation current of the diode
4. q is the electron charge ($1.60217646 \times 10^{-19}$ C)
5. k is the Boltzmann constant ($1.3806503 \times 10^{-23}$ J/K)
6. T is the temperature of the junction in Kelvin
7. a is the diode ideality constant (usually between 1-2)
8. $I_d$ represents the Shockley diode equation However, behavior of the practical PV arrays may be captured by adding additional terms to the I-V characteristics in Eqn. (14) to obtain:

$$I_{PV,L,k} = I_{PV} - I_0\left[\exp\left(\frac{V_{PV,k} + R_s I_{PV,L,k}}{V_t a}\right) - 1\right] - \frac{V_{PV,k} + R_s I_{PV,L,k}}{R_p} \quad (15)$$

where the additional terms are:

1. $R_s I_{PV,L,k}$: Added to $V_{PV,k}$ to represent the voltage drop due to the series resistance
2. $(V_{PV,k} + R_s I_{PV,L,k})/R_p$: Subtracted from the rest of the expression for $I_{PV,L,k}$ that represents the current lost through the parallel resistance path. Thus, when the PV array works as a current source, the current generated by an ideal array may diminish by this term to provide the actual load current.

Letting $N_{s,PV}$ to be the number of series cells in a PV string and $N_{p,PV}$ to be the number of parallel PV strings in an array, results in the following relations in Eqn. (15):

1. $V_t = N_{s,PV} kT/q$, the total thermal voltage of the array
2. $I_{PV} = N_{p,PV} I_{PV,cell}$, $I_0 = N_{p,PV} I_{0,cell}$ Equation (15) represents the non-linear relationship between the current drawn from a PV array and the resultant terminal voltage across it.

Scaling PV Arrays' Characteristics I-V Relation to One PV Cell

The relation between the cell and array level voltage and current may be given by:

$$V_{PV,k} = N_{s,PV} V_{PV,cell}, I_{PV,L,k} = N_{p,PV} I_{PV,L,cell} \quad (16)$$

where $V_{PV,cell}$ and $I_{PV,L,cell}$ are the voltage and load current of the array if it had only one cell in it. Substituting these relations from Eqn. (16) in Eqn. (15) will yield:

$$N_{p,PV} I_{PV,L,cell} = N_{p,PV} I_{PV,cell} - \quad (17)$$
$$N_{p,PV} I_{0,cell} \times \left[\exp\left(\frac{N_{s,PV} V_{PV,cell} + R_s N_{p,PV} I_{PV,L,cell}}{a N_{s,PV} kT/q}\right) - 1\right] -$$
$$\frac{N_{s,PV} V_{PV,cell} + R_s N_{p,PV} I_{PV,L,cell}}{R_p} \Rightarrow I_{PV,L,cell} =$$
$$I_{PV,cell} - I_{0,cell} \times \left[\exp\left(\frac{V_{PV,cell} + (R_s N_{p,PV}/N_{s,PV}) I_{PV,L,cell}}{akT/q}\right) - 1\right] -$$
$$\frac{V_{PV,cell} + (R_s N_{p,PV}/N_{s,PV}) I_{PV,L,cell}}{(R_p N_{p,PV}/N_{s,PV})}$$

Equation (17) thus shows that if the I-V relation for a PV array is available, it may be scaled down to a single cell array by dividing all the currents by $N_{p,PV}$, all the voltages by $N_{s,PV}$, and multiplying the series and parallel resistances of the array by ($N_{p,PV}/N_{s,PV}$). Knowing this, a scaled model containing any number of series cells and parallel strings may be obtained.

Model Parameter Identification

One possible method of finding the unknown model parameters $R_s$ and $R_p$ is explained in this section. Manufacturers' data for Kyocera KC200GT and Solarex MSX60 PV arrays at standard test conditions (STC) is shown in Table I. Standard test conditions refer to the tests conducted at a nominal temperature ($T_n$) of 25° C., and a nominal solar irradiation ($G_n$) of 1000 W/m². Using this data, unknown model parameters $R_s$ and $R_p$ are identified so that Eqn. (15) may be used to describe the I-V characteristics of the array, and then Eqn. (17) may be used to obtain a scaled down PV array. Additionally, dependence of the light-generated current on the temperature and solar irradiation may be expressed by:

$$I_{PV} = (I_{PV,n} + K_I \Delta_T)\frac{G}{G_n} \quad (18)$$

where $I_{PV,n}$ is the light-generated current at nominal conditions, $\Delta T = T - T_n$, T being the actual temperature and, G is the actual solar irradiation.

Although in the PV modeling, $I_{PV}$ is assumed equal to the short circuit current, $I_{SC}$ (the current when $V_{PV}=0$) due to a low series resistance and a high parallel resistance, a further improvement may be made by updating $I_{PV}$ as:

$$I_{PV,n} = \frac{R_p + R_s}{R_p} I_{sc,n} \quad (19)$$

where $I_{SC,n}$ is the nominal short circuit current. The temperature dependence of the reverse saturation current of the diode may be captured by:

$$I_0 = \frac{I_{SC,n} + K_I \Delta_T}{\exp[(V_{oc,n} + K_V \Delta_T)/aV_t] - 1} \quad (20)$$

Parameters to the model may be identified such that the resultant I-V characteristics curve matches the experimental curve at three important points, namely (0, $I_{SC}$), ($V_{mp}$, $I_{mp}$), and ($V_{oc}$, 0). In contrast to the prior art system, the current work poses the following multivariable, unconstrained optimization problem as a way of identifying the series and parallel resistances:

$$\min_{R_s, R_p} J = |P_{max,sim} - P_{max,e}| + |I_{PV,L,k}(@V_{PV,k} = 0) - I_{SC}| + \quad (21)$$
$$|I_{PV,L,k}(@V_{PV,k} = V_{oc})| \text{ subject to: } Eqs. 15, 18, 19, 20$$

Equation (21) is solved to obtain the values of series and parallel resistances for both the KC200GT and MSX60 arrays as 0.2469Ω and 0.2842Ω, and 13035Ω and 8052.3Ω respectively.

Algorithm to Estimate Photovoltaic Generated Current

Figure 17:
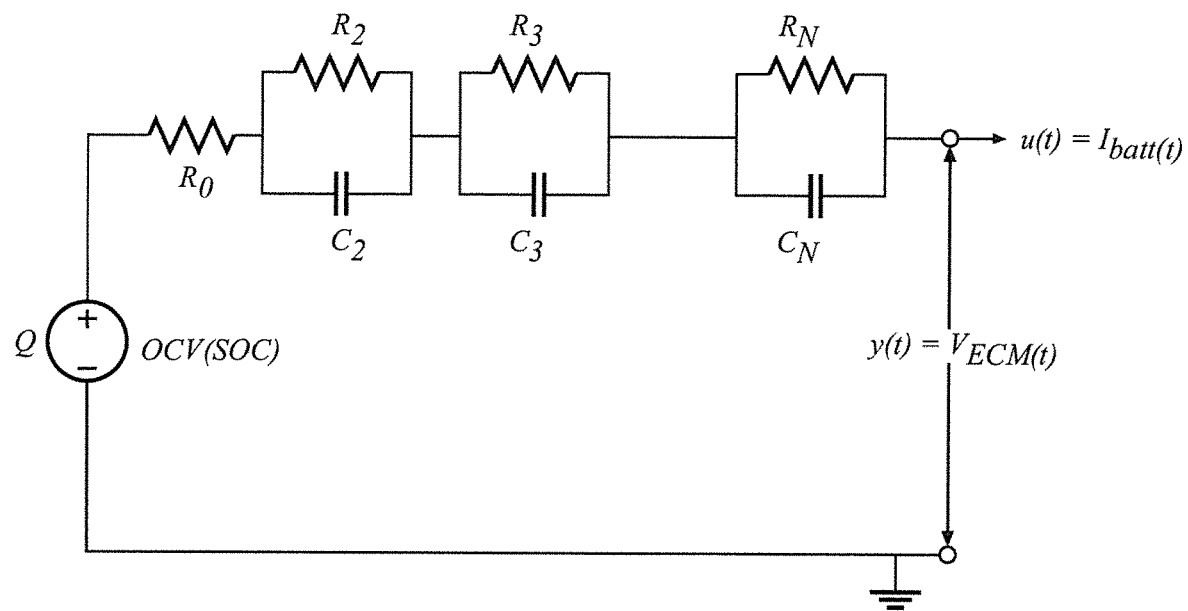
FIG. 17 is an $N^{th}$ order equivalent circuit model of a battery used in a hybrid photovoltaic/storage cell.

Some embodiments of the present invention may implement a MPPT algorithm to increase the power generation efficiency of the overall system. Since most traditional MPPT algorithms need information about the voltage across the PV array and current generated by it, such an algorithm when applied to the hybrid string may result in complete depletion of the integrated batteries. On the other hand, having current and voltage sensors in each hybrid cell may become cost prohibitive. So an embodiment of the present invention proposes the fusion of a model-based observer that can estimate the PV generated current and power based on the external load current supported by the series of the plurality of hybrid cells and a voltage output of each of the plurality of hybrid cells or the series of the plurality of hybrid cells, with a MPPT algorithm such as extremum seeking to achieve MPPT in each of the hybrid cells. The application of one such estimation algorithm to one embodiment of the present invention is demonstrated here to serve as an example. The schematic of the PV/EES integrated topology is given in FIG. 6, but the algorithm in general can be applied to an $N^{th}$ order EC model of the integrated Lithium ion cell, as shown in FIG. 17.

With the same relationship between battery current ($I_{batt}$), PV generated current ($I_{PV,L}$) and external load current ($I_{ext}$), the continuous-time state-space equations of the battery model in any arbitrary hybrid cell of a hybrid string can be written as:

$$\dot{x}_1 = \frac{I_{PV,L} - I_{ext}}{Q} + w_1 \quad (22a)$$

$$\dot{x}_i = -\frac{x_i}{\tau_i} + (I_{PV,L} - I_{ext}) + w_i, \quad i = 2, \ldots, N \quad (22b)$$

$$y = OCV(x_1) + \sum_{i=2}^{N} \frac{x_i}{C_i} + R_o(I_{PV,L} - I_{ext}) + v \quad (22c)$$

where $x_1$ is the SOC of the cell, $x_i$ is the charge across the capacitor of the $i^{th}$ R-C pair in FIG. 17, $\tau_i = R_i C_i$ is the time constant associated with the state variable $x_i$, $w_i$ and $v$ are the random numbers with the covariance matrices Q≥0 and R>0, respectively that are added to the state and output equations to emulate process and sensor noise.

Equations 22a-22c may be converted to discrete time assuming a zero order hold (ZOH) on the input current signals and written in a compact form as:

$$x_{k+1} = Ax_k - Bu_k + Bd_k + W = f(x_k, u_k, d_k) + W$$

$$y_k = g(x_k, u_k, d_k) + v_k \quad (23)$$

where $x = [x_1, x_2, \ldots, x_N]^T$ is the state vector, $u = I_{ext}$ is the known input, $d = I_{PV,L}$, the PV generated current is the unknown disturbance, W is the zero mean process noise matrix with the covariance Q, f and g are the functions representing the state evolution and output, k is the time step. The discrete time matrices are given by:

$$A = \begin{bmatrix} 1 & 0 & \cdots & 0 \\ 0 & e^{-\frac{\Delta t}{\tau_2}} & \cdots & 0 \\ \vdots & \vdots & \ddots & \vdots \\ 0 & 0 & \cdots & e^{-\frac{\Delta t}{\tau_N}} \end{bmatrix}, B = \begin{bmatrix} \frac{\Delta t}{Q} \\ \tau_2\left(1 - e^{\frac{-\Delta t}{\tau_2}}\right) \\ \vdots \\ \tau_N\left(1 - e^{\frac{-\Delta t}{\tau_N}}\right) \end{bmatrix} \quad (24)$$

The estimation algorithm that estimates the unknown input disturbance and the states of the system just from the output voltage measurements is implemented using the steps discussed here:

Step 0—Initialization

In this step, the observer is initialized with an assumption that an unbiased estimate of the initial state ($\hat{x}_{1|1}$) with known covariance ($P_{1|1}^x$) is available.

$$\hat{x}_{1|1} = \mathbb{E}[x_1](=\hat{x}_{1|0}) \quad (25a)$$

$$P_{1|1}^x = \mathbb{E}[(x_1 - \hat{x}_1)(x_1 - \hat{x}_1)^T](=P_{1|0}^x) \quad (25b)$$

Step 1—Unknown Disturbance Estimation

In this step, the error between the actual output voltage measurement and the predicted voltage using the best estimates is used to estimate the value of the unknown disturbance input. The nonlinear terms of the state space model of Eqn. (23) is locally linearized around the previous best estimates.

$$C_k = \frac{\partial g}{\partial x_k}\bigg|_{\hat{x}_{k|k-1}, \hat{d}_{k-1}} = \left[\frac{dOCV}{dx_1}\bigg|_{\hat{x}_{1,k|k-1}}, \frac{1}{C_2}, \cdots, \frac{1}{C_N}\right] \quad (26a)$$

$$\tilde{R}_k = C_k P_{k|k-1}^x C_k^T + R \quad (26b)$$

$$H = \frac{\partial g}{\partial d_k}\bigg|_{\hat{x}_{k|k-1}, \hat{d}_{k-1}} = R_o \quad (26c)$$

$$M_k = \left(H^T \tilde{R}_k^{-1} H\right)^{-1} H^T \tilde{R}_k^{-1} \quad (26d)$$

$$P_k^d = \left(H^T \tilde{R}_k^{-1} H\right)^{-1} \quad (26e)$$

$$\hat{d}_k = M_k\left(y_k - g(\hat{x}_{k|k-1}, u_k, \hat{d}_{k-1}) + H\hat{d}_{k-1}\right) \quad (26f)$$

where $C_k$ is the linearized output matrix obtained by linearizing the output function of Eqn. (23) with respect to the state variables, $P_{k|k-1}^x$ is the a-priori state error covariance matrix, R is the sensor noise covariance, H is the linearized coefficient matrix of the unknown disturbance, $M_k$ is the gain matrix to estimate the unknown disturbance, $P_k^d$ is the error covariance matrix for the disturbance estimation. All the matrices are evaluated at the last best estimates of the unknown quantities, e.g. the a-priori state estimate, $\hat{x}_{k|k-1}$ and the unknown disturbance estimate as the k−1 time step, $\hat{d}_{k-1}$.

Step 2—Measurement Update

In this step, voltage prediction error (difference between the measured and predicted voltage) is used with a calculated gain matrix to correct the a-priori state estimate to obtain the posterior state estimate.

$$K_k = P_{k|k-1}{}^x C_k^T \tilde{R}_k^{-1} \quad (27a)$$

$$\hat{x}_{k|k} = \hat{x}_{k|k-1} + K_k(y_k - g(\hat{x}_{k|k-1}, u_k, \hat{d}_k)) \quad (27b)$$

$$P_{k|k}{}^x = P_{k|k-1}{}^x - K_k(\tilde{R}_k - H P_k^d H^T) K_k^T \quad (27c)$$

$$P_k^{xd} = (P_k^{dx})^T = -K_k H P_k^d \quad (27d)$$

where, $K_k$ is the filter gain matrix to obtain the posterior state estimate from the a-priori state estimate and available output measurement, $P_{k|k}{}^x$ is the posterior state error covariance matrix and, $P_k^{xd}$ is the state and disturbance error cross-covariance matrix.

Step 3 Time Update

In this step, the posterior state estimate is propagated through a time using the state equation of Eqn. (23) to predict the a-priori state estimate of the next time step.

$$\hat{x}_{k+1|k} = f(\hat{x}_{k|k}, u_k, \hat{d}_k) \quad (28a)$$

$$G = \frac{\partial f}{\partial d_k}\bigg|_{\hat{x}_{k|k}, \hat{d}_k} = B \quad (28b)$$

$$P_{k+1|k}^x = [A \; G] \begin{bmatrix} P_{k|k}^x & P_k^{xd} \\ P_k^{dx} & P_k^d \end{bmatrix} [A \; G]^T + Q \quad (28c)$$

where, $\hat{x}_{k+1|k}$ is the a-priori state estimate at the k+1 time step, G is the linearized coefficient matrix of the unknown disturbance in the state equation and, $P_{k+1|k}^x$ is the a-priori state error covariance matrix.

Using the estimate of the PV generated current and the measured voltage, an estimate of the PV generated power may be obtained for implementing the MPPT algorithm. Further analysis of this estimation algorithm also shows that the noise in the disturbance estimates is dependent on the internal resistance of the battery model and accuracy of the voltage sensor. Specifically, a larger internal resistance and an accurate voltage sensor will result in less error in the disturbance estimates.

Simulation Based Evaluation of the Disturbance Estimation Algorithm

Figure 18:
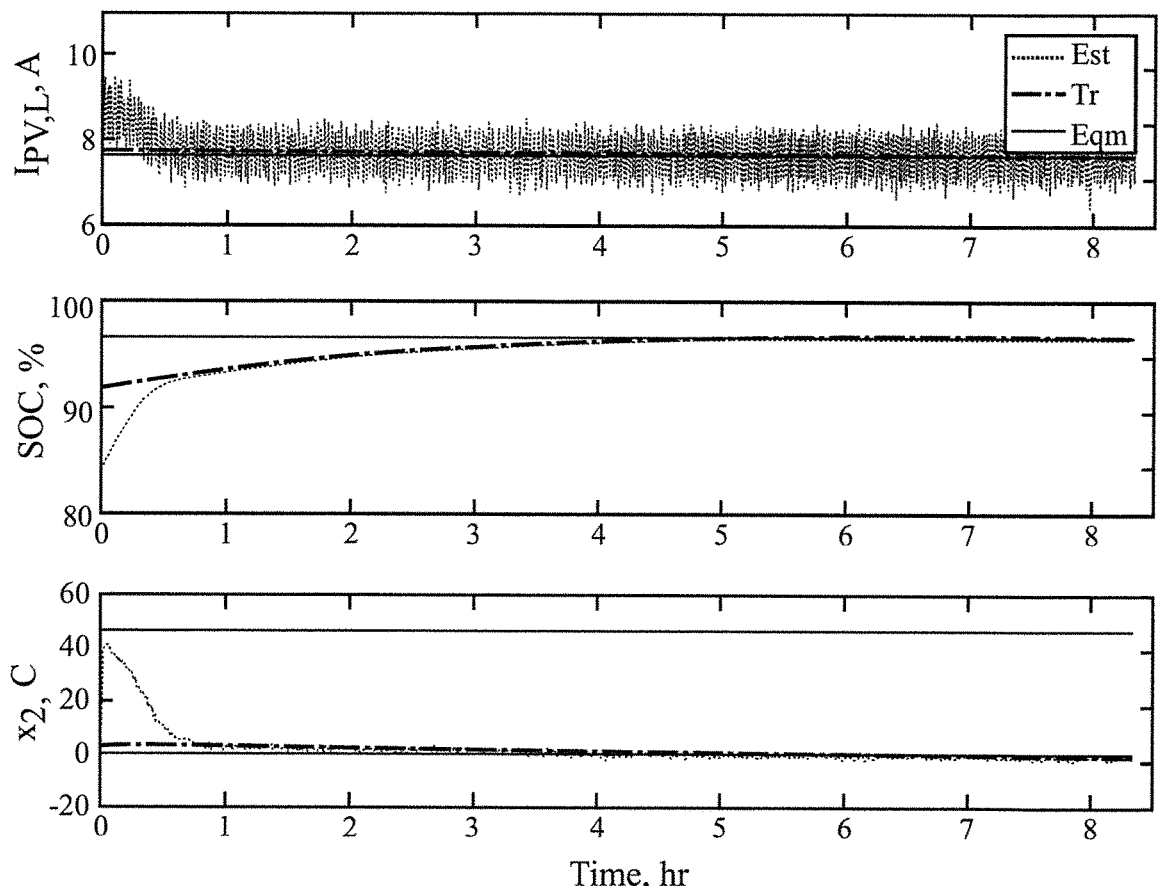
FIG. 18 is a graphical representation of the performance of the estimation algorithm in estimating the states of the battery and the PV generated current in a single hybrid cell.

The system is simulated using a scaled PV array model of the Kyocera KC200GT variant and a second order EC model of a 4.47 A-hr LFP cell. For the first simulation case study, the algorithm is applied to a single hybrid cell consisting of a PV array connected in parallel to a single LFP cell. FIG. 18 shows the simulation results. The dotted signals in each of the subplots represent the estimated values, the dot-dashed signals are the true values, and the solid lines are values at the equilibrium. The subplots from top to bottom show the temporal variations of the PV generated current, SOC and $x_2$ respectively for a single hybrid cell. The voltage sensor noise is assumed to be Gaussian random with a standard deviation of 1 mV. The convergence of the estimated values to their true values can be clearly seen from the FIG. 18.

Figure 19:
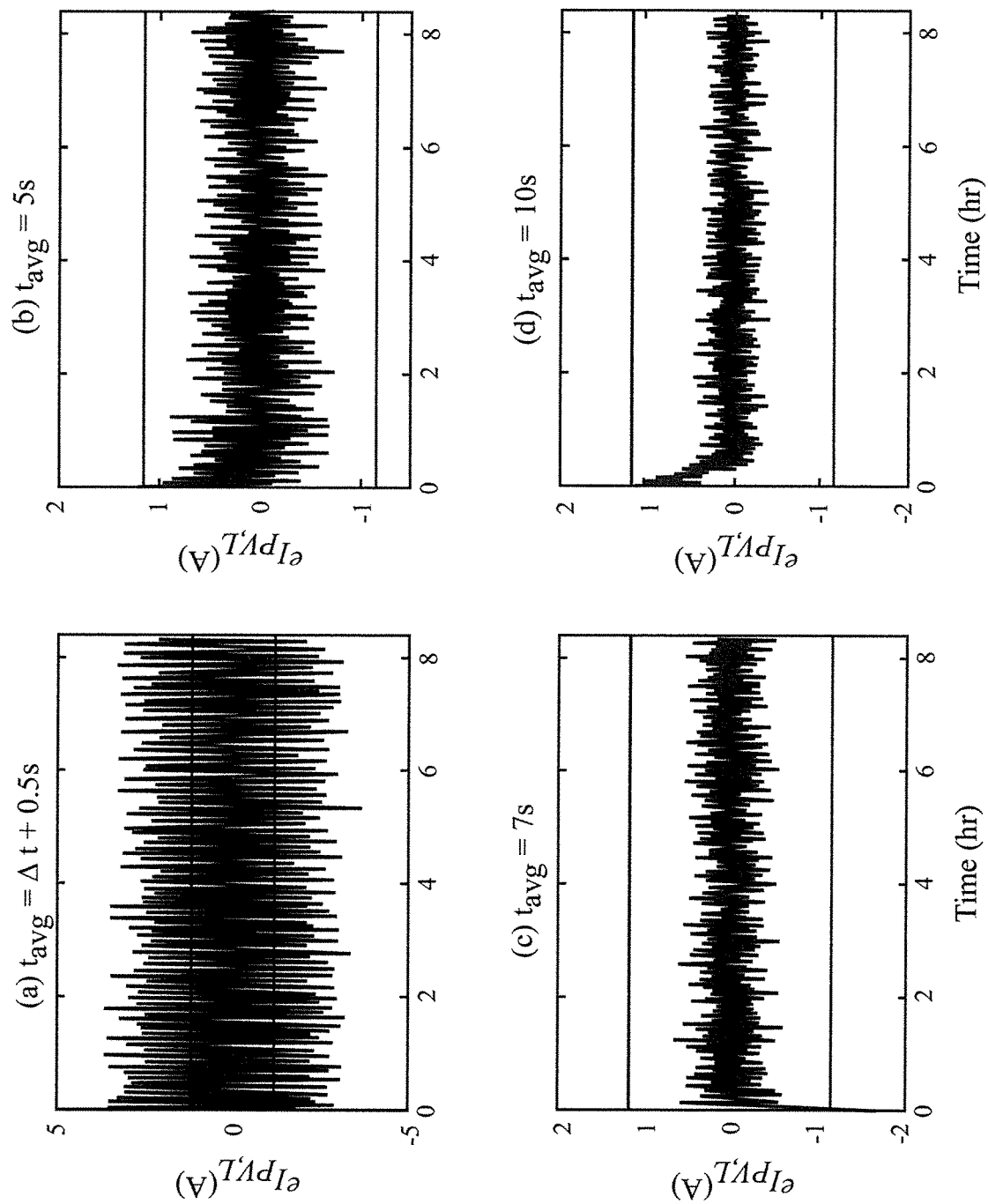
FIG. 19 is a graphical representation of the effects of averaging the estimated signals over a time window on the estimation noise attenuation.

The second simulation case study shows that the noise in the disturbance estimates can be further attenuated by averaging the estimated signals over a given time window. This is illustrated in FIG. 19 where each subplot shows the variation of error in estimating the PV generated current (i.e. the difference between true and estimated PV generated current) with time for four different averaging time windows of lengths 0.5, 5, 7 and 10 seconds. The simulated sensor noise in this case has a mean of 0 V and standard deviation of 5 mV. The solid horizontal lines in all the subplots may represent a theoretical lower bound on the disturbance estimation covariance. It can be seen from FIG. 19 that by performing averaging of the estimated signal over the different time windows, significant estimation noise attenuation can be achieved.

Figure 20:
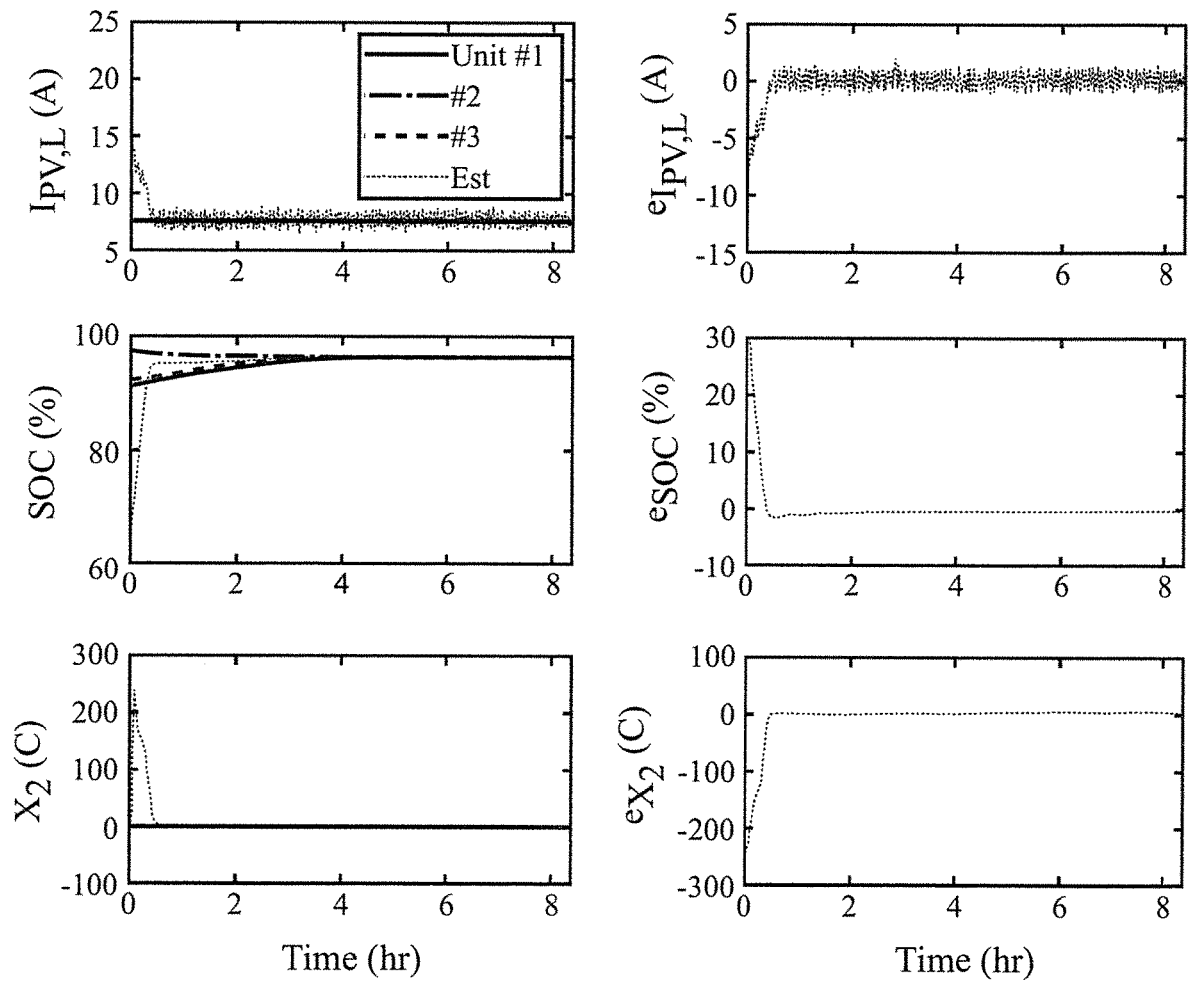
FIG. 20 is a graphical representation of estimation of average values of different signals when the algorithm is applied to a hybrid string with only the string level voltage signals being available for the estimation.

In this final case study, the estimation algorithm is applied to a hybrid string consisting of three hybrid units in series and the signals that are available for measurement are the external load current $I_{ext}$ and the total string voltage. The estimated values, true values for each hybrid cell and the equilibrium values for the PV generated current, SOC and $x_2$ are shown in the left three subplot of FIG. 20. The subplots on the right show the errors in estimating PV generated current, SOC and $x_2$ from their corresponding average values over the three hybrid units. For example, the signal $e_{SOC} = SOC_{estimated} - (SOC_{\#1} + SOC_{\#2} + SOC_{\#3})/3$. This shows that for certain embodiments of the present invention, when only the string level voltage and external load current information is available, a model-based estimation algorithm can be used to estimate signals needed to implement MPPT in an average sense.

CONCLUSION

According to an embodiment of the present invention, a novel integration topology of Electrochemical Energy Storage (EES) into PV arrays is proposed such that the total cost of integration may be reduced. The inherently self-balancing nature of the present invention may reduce the need for much of the power electronics, otherwise required for battery pack balancing in a prior art PV farm setup. An equivalent-circuit (EC) model of the Li-ion cell along with a single diode model of the PV array is used to simulate the hybrid system under the different operating scenarios. These simulation studies also asserted the five significant insights obtained regarding the behavior of this hybrid unit during the process of proving its global, asymptotic stability. While self-balancing occurs under the different conditions, the simplest rendition of the hybrid unit without any connecting device between the PV array and Li-ion cell necessitates the latter to be operated at a much higher state of charge (SOC) to avoid very slow balancing. This may be avoided by proposing integration of parallel strings of PV array in a single hybrid unit to increase the generated current, thereby speeding up the balancing action. This makes it apparent that the self-balancing speed and the amount of generated PV current follow an inverse trend and the best balance between the two may be achieved when the equilibrium point of the battery storage in terms of voltage coincides with the voltage at the Maximum Power Point (MPP) of the PV array in a hybrid cell. This however corresponds to operating the Li-ion cell at a higher state of charge (SOC). It is also shown that an estimation-based MPPT method may be implemented feasibly to some embodiments of the hybrid cell, and avoid complete cell discharging problems that classical MPPT methods may face when applied to the present invention.

The present invention has been described with reference to some embodiments. However, it is realized that variants and equivalents to the preferred embodiments may be provided without departing from the scope of the invention as defined in the accompanying claims. It is to be understood that both the foregoing general description and the following detailed description of the present invention are exemplary and explanatory and are intended to provide further explanation of the invention as claimed. It is not intended to be exhaustive or to limit embodiments to the precise form disclosed. As such, this disclosure should be interpreted broadly. It is intended that the scope be defined by the claims appended hereto.

The invention claimed is:

1. A self-balancing photovoltaic energy storage system, comprising:
    a plurality of hybrid cells each operable to generate DC electrical power, each hybrid cell comprising at least one solar power generation unit for generating DC electrical power and an electrochemical energy storage device for storage of the generated DC electrical power, the at least one solar power generation unit and the electrochemical energy storage device connected in parallel; and
    the electrochemical energy storage devices of the plurality of hybrid cells are connected in series;
    wherein the self-balancing is achieved by the topology of integration of the electrochemical energy storage device with the at least one solar power generation unit in parallel, in conjunction with the series connection of the electrochemical energy storage devices of the plurality of the hybrid cells, without need of additional power balancing electronics.

2. The self-balancing photovoltaic energy storage system of claim 1, further comprising an inverter operable to convert DC electrical power into AC electrical power and electrically coupled to the series of the electrochemical energy storage devices.

3. The self-balancing photovoltaic energy storage system of claim 2, further comprising a maximum-power-point tracking (MPPT) controller operable to implement an extremum-seeking algorithm to adjust the DC electrical power and/or the AC electric power converted by the inverter to optimize an output of each hybrid cell based on a current generated by the series of the plurality of hybrid cells and a voltage output of each or all of the plurality of hybrid cells.

4. The self-balancing photovoltaic energy storage system of claim 1, wherein the at least one solar power generation unit of each of the plurality of hybrid cells comprises two or more solar power generating units connected in series.

5. The self-balancing photovoltaic energy storage system of claim 1, wherein the at least one solar power generation unit of each of the plurality of hybrid cells comprises two or more solar power generating units connected in parallel.

6. The self-balancing photovoltaic energy storage system of claim 1, wherein of each of the plurality of hybrid cells further comprises a connecting device, wherein the at least one solar power generation unit of each of the plurality of hybrid cells is electrically connected to the respective electrochemical energy storage device through the respective connecting device.

7. The self-balancing photovoltaic energy storage system of claim 6, wherein each of the connecting devices is a DC-DC converter.

8. The self-balancing photovoltaic energy storage system of claim 7, further comprising a maximum-power-point tracking (MPPT) controller operable to implement an extremum-seeking algorithm to adjust a DC-DC conversion ratio of each connecting device between the respective at least one solar power generation unit and the respective electrochemical energy storage device to optimize an output of each hybrid cell based on a current generated by the series of the plurality of hybrid cells and a voltage output of each or all of the plurality of hybrid cells.

9. The self-balancing photovoltaic energy storage system of claim 6, wherein each of the connecting devices is a buck-boost converter.

10. The self-balancing photovoltaic energy storage system of claim 1, wherein the at least one solar power generating unit of each of the plurality of hybrid cells is directly connected in parallel with the respective electrochemical energy storage device.

11. The self-balancing photovoltaic energy storage system of claim 10, wherein the at least one solar power generating unit of each of the plurality of hybrid cells is directly connected in parallel with the respective power storage device without a connecting device.

12. A method for operating a self-balancing photovoltaic energy storage system, comprising the steps of:
    providing a plurality of hybrid cells, wherein each hybrid cell comprises at least one solar power generating unit for generating DC electrical power and a electrochemical energy storage device for storage of the generated DC electrical power;
    generating a DC electrical power using the solar power generating units;
    connecting the at least one solar power generating unit and the electrochemical energy storage device of each hybrid cell in parallel;
    transferring the DC electrical power from the at least one solar power generating unit to the electrochemical energy storage device;
    connecting the electrochemical energy storage devices of the plurality of hybrid cells in series; and
    self-balancing the photovoltaic energy storage system by having the topology of integration of the electrochemical energy storage device with the at least one solar power generation unit in parallel, in conjunction with the series connection of the electrochemical energy storage devices of the plurality of the hybrid cells, without need of additional power balancing electronics.

13. The method of claim 12, further comprising:
    connecting at least one inverter to the series of electrochemical energy storage devices; and
    transferring the DC electrical power from the electrochemical energy storage devices to the at least one inverter.

14. The method of claim 13, further comprising:
    providing a maximum-power-point tracking (MPPT) controller operable to implement an extremum-seeking algorithm;
    measuring a current generated by the series of the plurality of hybrid cells and a voltage output of each or all of the plurality of hybrid cells;
    communicating the current generated and the voltage output to the controller;
    adjusting the DC electrical power and/or the AC electric power converted by the inverter by the extremum-seeking algorithm; and
    optimizing an output of the hybrid cell based on the current and the voltage by the extremum-seeking algorithm.

15. The method of claim 12, wherein the at least one solar power generating unit of at least one of the plurality of hybrid cells comprises two or more solar power generating units; and
    connecting the two or more solar power generating units in series and/or in parallel.

16. The method of claim 12, further comprising providing a connecting device and connecting the at least one solar power generation unit to the electrochemical energy storage device through the connecting device.

17. The method of claim 16, wherein the connecting device is a DC-DC converter.

18. The method of claim 17, further comprising:
    providing a maximum-power-point tracking (MPPT) controller operable to implement an extremum-seeking algorithm;
    measuring a current generated by the series of the plurality of hybrid cells and a voltage output of each or all of the plurality of hybrid cells;
    communicating the current generated and the voltage output to the controller;
    adjusting a DC-DC conversion ratio of the connecting device between the at least one solar power generation unit and the electrochemical energy storage device by the extremum-seeking algorithm; and
    optimizing an output of the hybrid cell based on the current and the voltage by the extremum-seeking algorithm.

19. The method of claim 16, wherein the connecting device is a buck-boost converter.

20. The method of claim 12, further comprising a step of directly connecting the at least one solar power generating unit with the electrochemical energy storage device without a connecting device.

\* \* \* \* \*